United States Patent
Fouet et al.

(10) Patent No.: US 10,348,698 B2
(45) Date of Patent: Jul. 9, 2019

(54) METHODS AND SYSTEMS FOR LINK-BASED ENFORCEMENT OF ROUTING OF COMMUNICATION SESSIONS VIA AUTHORIZED MEDIA RELAYS

(71) Applicant: Nagravision S.A., Cheseaux-sur-Lausanne (CH)

(72) Inventors: Jean-Baptiste Fouet, Morges (CH); Laurent Gauteron, Evian (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 153 days.

(21) Appl. No.: 15/266,288

(22) Filed: Sep. 15, 2016

(65) Prior Publication Data
US 2018/0077126 A1    Mar. 15, 2018

(51) Int. Cl.
*H04L 29/06* (2006.01)
*H04W 12/02* (2009.01)

(52) U.S. Cl.
CPC ...... *H04L 63/0435* (2013.01); *H04L 63/0442* (2013.01); *H04L 63/0464* (2013.01); *H04L 63/306* (2013.01); *H04W 12/02* (2013.01)

(58) Field of Classification Search
CPC ............. H04L 63/0435; H04L 63/0442; H04L 63/0464; H04L 63/302; H04L 63/304; H04L 63/306; H04W 12/02
See application file for complete search history.

(56) References Cited

U.S. PATENT DOCUMENTS

| | | | | |
|---|---|---|---|---|
| 2006/0090074 A1* | 4/2006 | Matoba | ............. | H04L 63/0272 713/171 |
| 2008/0242422 A1* | 10/2008 | Kropivny | ............. | A63F 13/12 463/42 |
| 2009/0182668 A1 | 7/2009 | Lee | | |
| 2009/0204817 A1 | 8/2009 | Deana-Roga | | |
| 2010/0250951 A1* | 9/2010 | Ueno | ............. | H04L 9/0844 713/176 |
| 2012/0166582 A1* | 6/2012 | Binder | ............. | H04L 63/18 709/217 |

(Continued)

FOREIGN PATENT DOCUMENTS

WO    2012154420    11/2012

OTHER PUBLICATIONS

Written Opinion of The International Searching Authority for PCT/EP2017/073217 dated Mar. 22, 2018.

*Primary Examiner* — Ghodrat Jamshidi
(74) *Attorney, Agent, or Firm* — Oblon, McClelland, Maier & Neustadt, L.L.P.

(57) ABSTRACT

Disclosed herein are methods and systems for link-based enforcement of routing of communication sessions via authorized media relays. In an embodiment, a media relay receives encrypted first payloads from a first endpoint and encrypted second payloads from a second endpoint as part of a session. The encrypted first payloads require a first key for decryption and the encrypted second payloads requite a second key for decryption. The media relay is preconfigured prior to the session with secrets useable for identifying the first and second keys. The media relay decrypts the first payloads using the first key and decrypts the second payloads using the second key, and transmits the first payloads to the second endpoint and the second payloads to the first endpoint as part of the session.

17 Claims, 19 Drawing Sheets

(56) References Cited

U.S. PATENT DOCUMENTS

| | | | |
|---|---|---|---|
| 2012/0177198 A1* | 7/2012 | Cabos | H04L 9/0825 |
| | | | 380/270 |
| 2013/0081132 A1* | 3/2013 | Lee | H04L 63/0272 |
| | | | 726/15 |
| 2014/0205089 A1* | 7/2014 | Irwin | H04L 9/0877 |
| | | | 380/44 |
| 2014/0289531 A1* | 9/2014 | Yamakawa | H04L 9/3263 |
| | | | 713/176 |
| 2017/0237556 A9* | 8/2017 | Denning | H04L 9/0822 |
| | | | 713/168 |
| 2017/0337542 A1* | 11/2017 | Kim | G06Q 20/3255 |

* cited by examiner

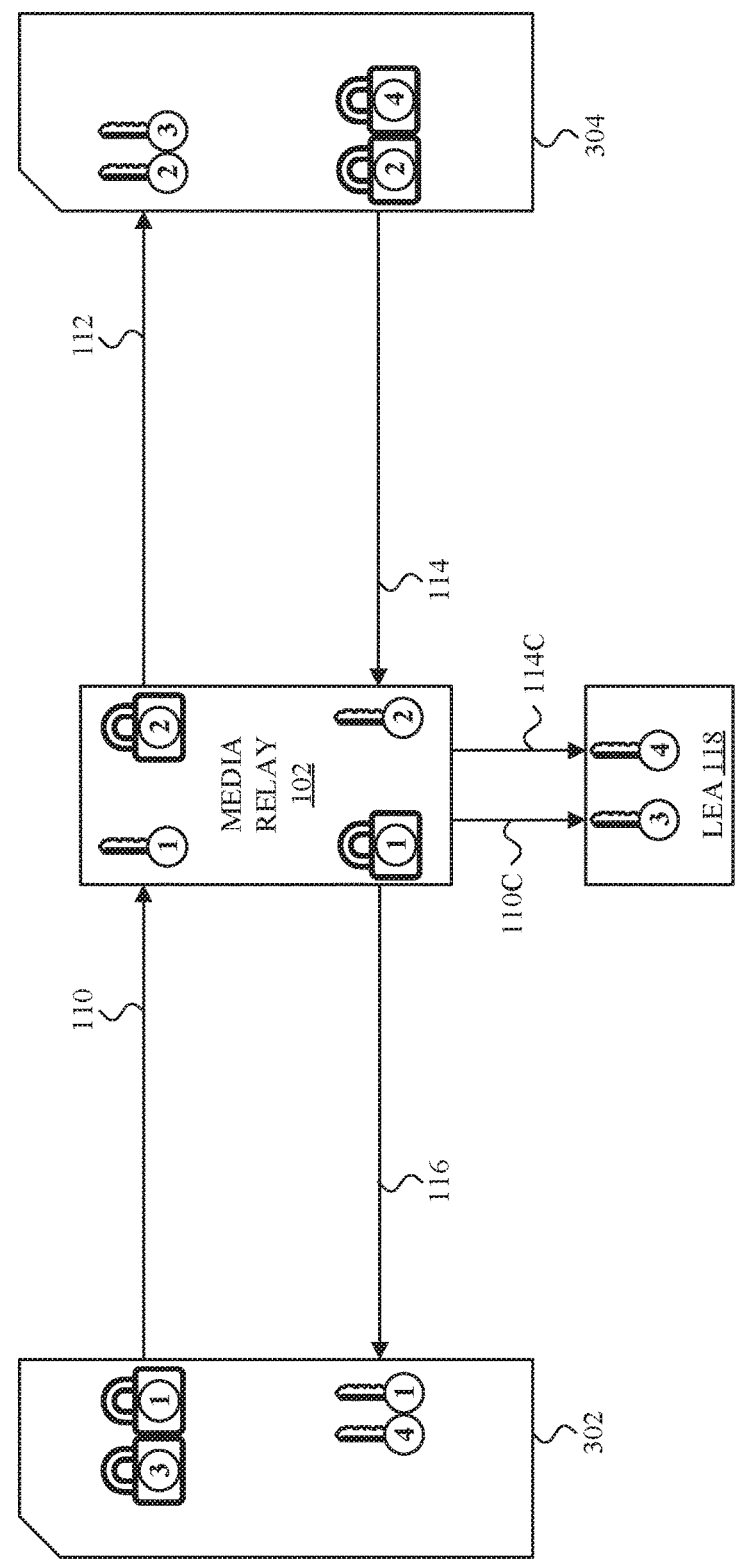

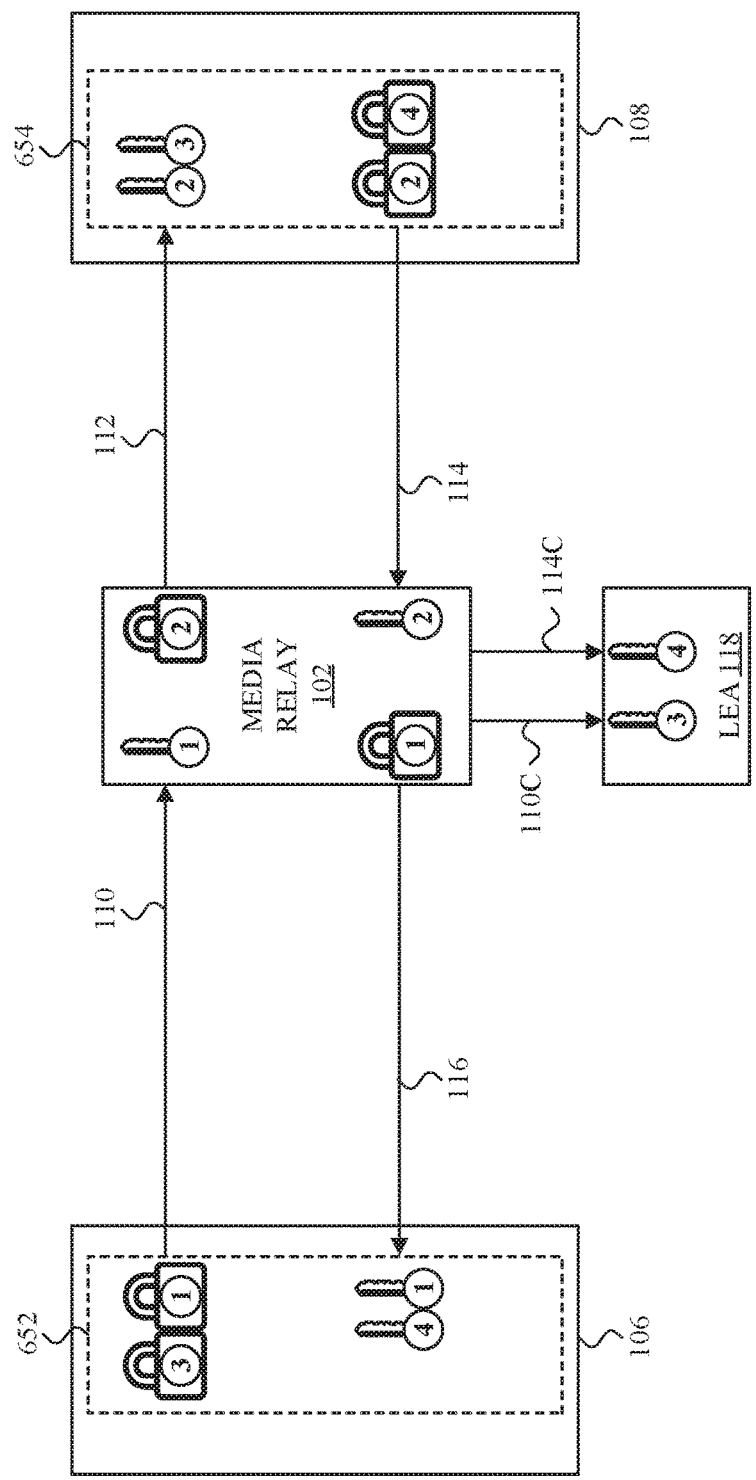

METHODS AND SYSTEMS FOR LINK-BASED ENFORCEMENT OF ROUTING OF COMMUNICATION SESSIONS VIA AUTHORIZED MEDIA RELAYS

BACKGROUND

People communicate wirelessly and on the go. Among the devices that make this possible are those sometimes referred to as personal mobile devices, examples of which include cell phones, smartphones, walkie-talkies, and portable hotspots, among others. A personal mobile device could be handheld, body-mounted, or vehicle-mounted, as examples.

Given the relative ease with which radio signals and other communications can be intercepted, communication with or between personal mobile devices is often encrypted to prevent successful interception of the communication by third parties. Generally speaking, encryption is the process of converting audible voice or other data into unintelligible data, while decryption is the process of converting the unintelligible data back to the original, e.g., audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

Although many forms of communication may be encrypted, government agencies, such as the NSA, may obtain authorization to listen in on communication sessions for various reasons, such as suspicion of criminal activity, suspicion of terrorist activity, etc.

OVERVIEW

Described herein are methods and systems for link-based enforcement of routing of communication sessions via authorized media relays.

One embodiment takes the form of a method that includes a media relay receiving encrypted first payloads from a first endpoint in connection with a first session, where the encrypted first payloads had been encrypted in the first endpoint such that decryption of the encrypted first payloads requires a first key. The media relay had been preconfigured prior to the first session with a first-key secret useable by the media relay for identifying the first key.

The method also includes the media relay receiving encrypted second payloads from a second endpoint in connection with the first session, where the encrypted second payloads had been encrypted in the second endpoint such that decryption of the encrypted second payloads requires a second key. The media relay had also been preconfigured prior to the first session with a second-key secret useable by the media relay for identifying the second key.

The method also includes the media relay generating decrypted first payloads at least in part by using the first key to decrypt the encrypted first payloads, and further includes the media relay generating decrypted second payloads at least in part by using the second key to decrypt the encrypted second payloads. The method also includes the media relay transmitting the first payloads to the second endpoint, and further includes the media relay transmitting the second payloads to the first endpoint in connection with the first session.

In at least one embodiment, the first key is a first media-relay private key for which there is a corresponding first media-relay public key; the second key is a second media-relay private key for which there is a corresponding second media-relay public key; the encrypted first payloads had been encrypted in the first endpoint with the first media-relay public key; and the encrypted second payloads had been encrypted in the second endpoint with the second media-relay public key.

In at least one embodiment, the first key is a first shared key between the first endpoint and the media relay; the second key is a second shared key between the second endpoint and the media relay; the encrypted first payloads had been encrypted in the first endpoint with the first shared key; and the encrypted second payloads had been encrypted in the second endpoint with the second shared key. In at least one such embodiment, the media relay re-encrypts the decrypted first payloads with the second shared key prior to transmitting the first payloads to the second endpoint, and re-encrypts the decrypted second payloads with the first shared key prior to transmitting the second payloads to the first endpoint.

In at least one embodiment, the media relay (i) re-encrypts the decrypted first payloads such that decryption of the re-encrypted first payloads requires a third key prior to transmitting the first payloads to the second endpoint, which had been preconfigured with a third-key secret useable by the second endpoint for identifying the third key and (ii) re-encrypts the decrypted second payloads such that decryption of the re-encrypted second payloads requires a fourth key prior to transmitting the second payloads to the first endpoint, which had been preconfigured with a fourth-key secret useable by the first endpoint for identifying the fourth key.

In at least one embodiment, the media relay transmits copies of the first and second payloads to an additional endpoint. In at least one such embodiment, the additional endpoint includes or is a legal-intercept endpoint. In at least one such embodiment, the media relay re-encrypts the first and second payloads prior to transmitting copies of the first and second payloads to the additional endpoint. In at least one embodiment, the encrypted first payloads were also encrypted such that decryption of the encrypted first payloads requires a third key; in at least one such embodiment, the encrypted second payloads were also encrypted such that decryption of the encrypted second payloads requires the third key; in at least one other such embodiment, the encrypted second payloads were also encrypted such that decryption of the encrypted second payloads requires a fourth key.

In at least one embodiment, the encrypted first payloads were also encrypted such that decryption of the encrypted first payloads requires a third key, and the encrypted second payloads were also encrypted such that decryption of the encrypted second payloads requires a fourth key. In at least one such embodiment, the third key and the fourth key are the same shared end-to-end key. In at least one other such embodiment, the third key and the fourth key are different keys.

In at least one embodiment, one or both of the first and second endpoints is a communication device.

In at least one embodiment, one or both of the first and second endpoints is an application executing on a communication device.

In at least one embodiment, one or both of the first and second endpoints is a secure element.

Furthermore, additional embodiments take the form of processor-based systems that include data storage containing instructions executable by the respective processor for causing the respective processor-based system to carry out functions including various combinations of the method steps recited above and elsewhere in this disclosure.

Another embodiment takes the form of a media relay that includes a cryptography module and a communication module. The cryptography module is preconfigured with a first-key secret useable by the media relay for identifying a first key and with a second-key secret useable by the media relay for identifying a second key. The communication module is configured to (i) receive encrypted first payloads from a first endpoint in connection with a first session, where the encrypted first payloads had been encrypted in the first endpoint such that decryption of the encrypted first payloads requires the first key; (ii) receive encrypted second payloads from a second endpoint in connection with the first session, where the encrypted second payloads had been encrypted in the second endpoint such that decryption of the encrypted second payloads requires the second key; and (iii) pass the received encrypted first payloads and the received encrypted second payloads to the cryptography module. The cryptography module is configured to (i) generate decrypted first payloads at least in part by using the first key to decrypt the encrypted first payloads; (ii) generate decrypted second payloads at least in part by using the second key to decrypt the encrypted second payloads; and (iii) pass the decrypted first payloads and the decrypted second payloads to the communication module, which is further configured to transmit the first payloads to the second endpoint and to transmit the second payloads to the first endpoint.

In at least one embodiment, one or both of the first and second endpoints is selected from the group consisting of a communication device and an application executing on a communication device.

In at least one embodiment, one or both of the first and second endpoints is a secure element.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure. Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

BRIEF DESCRIPTION OF THE DRAWINGS

Various example embodiments are described herein with reference to the following drawings, in which like numerals denote like entities.

FIG. 9A depicts a seventh session example with enforced routing, legal intercept, and end-to-end encryption, in accordance with at least one embodiment.

FIG. 9B depicts an eighth session example with enforced routing, legal intercept, and end-to-end encryption, in accordance with at least one embodiment.

Figure 1:
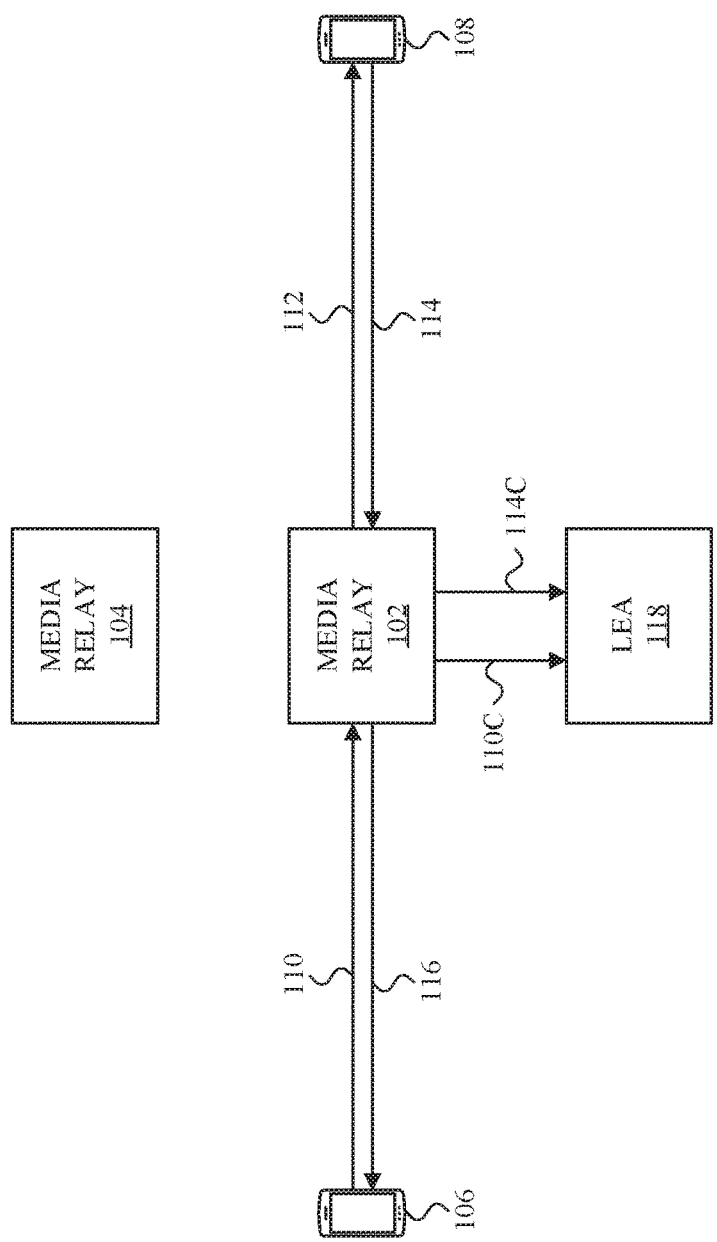
FIG. 1 depicts a first example routing scenario in which an authorized media relay is traversed, in accordance with at least one embodiment.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

DETAILED DESCRIPTION

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

In this disclosure, various elements of one or more of the described embodiments are referred to as modules that carry out, i.e., perform, execute, and the like, various functions described herein. As the term "module" is used herein, each described module includes hardware, e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes or at least has access to any necessary instructions executable for carrying out the one or more functions described as being carried out by the particular module; those instructions could take the form of or include hardware (i.e., hardwired) instructions, firmware instructions, software instructions, and/or the like, stored in any non-transitory computer-readable medium deemed suitable by those of skill in the relevant art in a given context and/or for a given implementation.

II. Examples of Arrangement and Architecture

FIG. 1 depicts a first example routing scenario in which an authorized media relay is traversed, in accordance with at least one embodiment. In particular, FIG. 1 depicts a routing scenario 100 that involves a media gateway 102, a media gateway 104, a client device 106, a client device 108, bearer media legs 110, 112, 114, and 116, copied media legs 110C and 114C, and a law-enforcement agency (LEA) server 118. In the depicted example, the media gateway 102 is an authorized media relay. A media relay being authorized may mean that it is approved by a given service provider for use in bearing communication sessions between communication endpoints that make use of a communication service provided by the given service provider. A media relay being authorized may mean that it is accessible to law enforcement for carrying out of legal intercept. And certainly one or more other definitions in combination or in the alternative may be used for distinguishing an authorized media relay from an unauthorized media relay.

Further to the example of FIG. 1, the media relay 104 is considered to be an unauthorized media relay in this example. The media relay 102 is depicted as a go-between for the client devices 106 and 108 in a communication session that is being monitored pursuant to a valid warrant by the LEA server 118. The media relay 102 receives first payloads (e.g., of VoIP packets, text packets, instant messaging packets, video packets, and/or the like) at 110 from the client device 106 and forwards those first payloads to the client device 108 at 112. The media relay 102 also receives second payloads at 114 from the client device 108 and forwards those second payloads to the client device 106 at 116. Furthermore, the media relay transmits copies 110C and 114C of the inbound (to the media relay) streams 110 and 114 to enable the LEA server 118 to obtain a complete copy of the intercepted communication.

Figure 2:
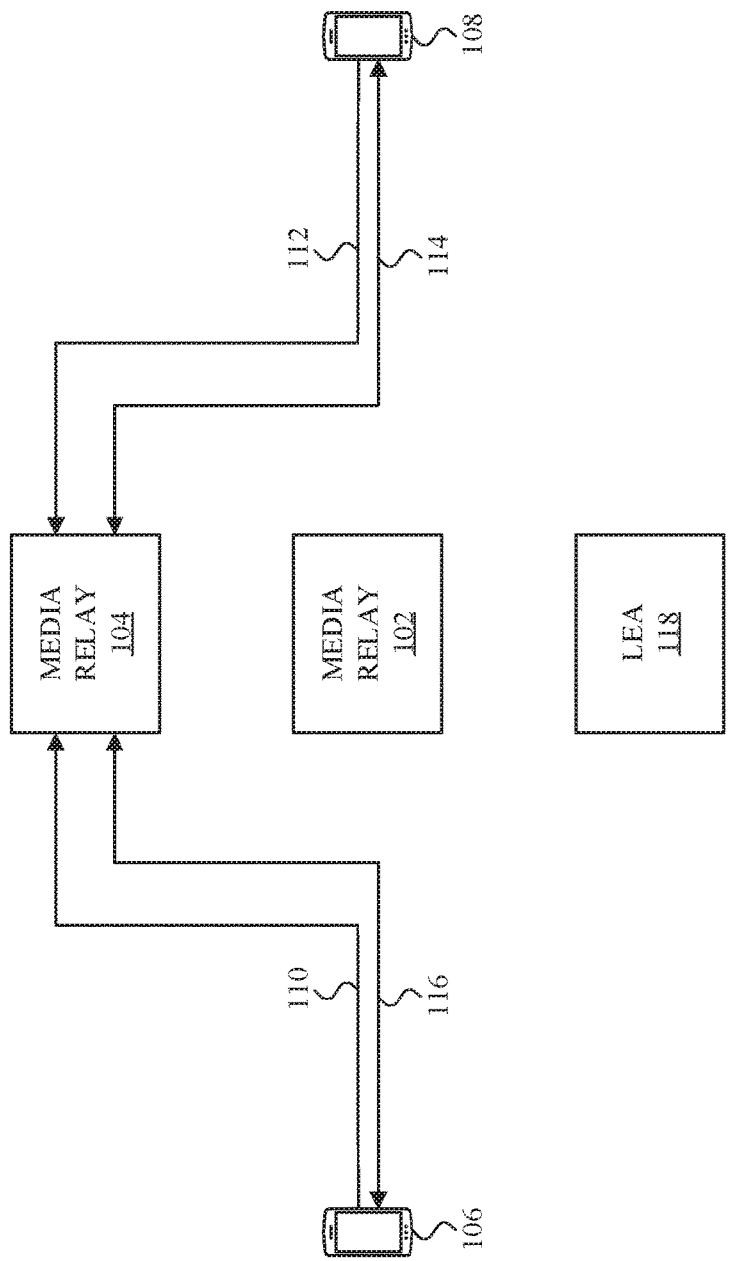
FIG. 2 depicts a second example routing scenario in which an authorized media relay is not traversed.

FIG. 2 depicts a second example routing scenario in which an authorized media relay is not traversed. In particular, FIG. 2 depicts a routing scenario 200 that is similar to the routing scenario 100 other than that the client devices 106 and 108 are communicating with one another via the unauthorized media relay 104 instead of via the authorized media relay 102. As can be seen in FIG. 2, the same four bearer streams 110-116 are present, but the LEA server 118 is unable to obtain the copy streams 110C and 114C—which don't exist in this scenario—because the LEA server 118 in this example has no access to the unauthorized (e.g., private) media relay 104. In one example, the users of the client devices 106 and 108 may accomplish this unauthorized and unable-to-be-legally-intercepted communication via the unauthorized media relay 104 by modifying packet headers to route bearer packets (containing the substantive payloads of the session) via the media relay 104 instead of via the media relay 102.

Figure 3:
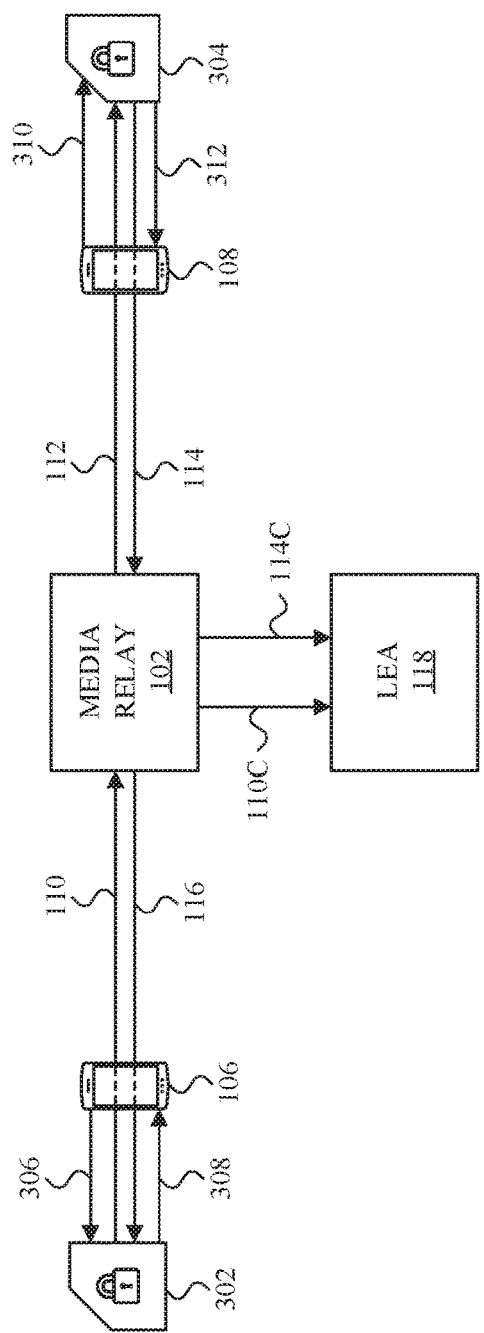
FIG. 3 depicts a third example routing scenario in which an authorized media relay is traversed and in which secure-element endpoints of a session participate via associated client devices, in accordance with at least one embodiment.

FIG. 3 depicts a third example routing scenario in which an authorized media relay is traversed and in which secure-element endpoints of a session participate via associated client devices, in accordance with at least one embodiment. In particular, FIG. 3 depicts a routing scenario 300 that is similar in some ways to the routing scenario 100 of FIG. 1, other than that the endpoints to the session that is traversing the authorized media relay 102 are a secure element 302 (that is associated with the client device 106) and a secure element 304 (that is associated with the client device 108). Secure elements such as the secure elements 302 and 304 are discussed more fully below. For purposes of FIG. 3, it is noted that the secure element 302 communicates via the client device 106 and that the secure element 304 communicates via the client device 108.

Thus, the stream 110 is transmitted by the secure element 302 via the client device 106 to the media relay 102, which then forwards the content of the stream 110 to the secure element 304 via the client device 108 as the stream 112. Likewise, the stream 114 is transmitted by the secure element 304 via the client device 108 to the media relay 102, which then forwards the content of the stream 114 to the secure element 302 via the client device 106 as the stream 116. The copy streams 110C and 114C are still provided by the media relay 102 to the LEA server 118.

Audio (and/or video, etc.) may be received by the client device 106 and transmitted in the clear at 306 to the secure element 302, which may then encrypt that audio and transmit it as part of the stream 110. Similarly, audio may be received by the client device 108 and transmitted in the clear at 310 to the secure element 304, which may then encrypt that audio and transmit it as part of the stream 114. Upon receipt of the stream 116, the secure element 302 may decrypt the audio data therein, and pass the decrypted audio in the clear at 308 to the client device 106 for playout via a user interface (e.g., speaker) of that client device. Similarly, upon receipt of the stream 112, the secure element 304 may decrypt the audio data therein, and pass the decrypted audio in the clear at 312 to the client device 108 for playout via a user interface of that client device.

Figure 4:
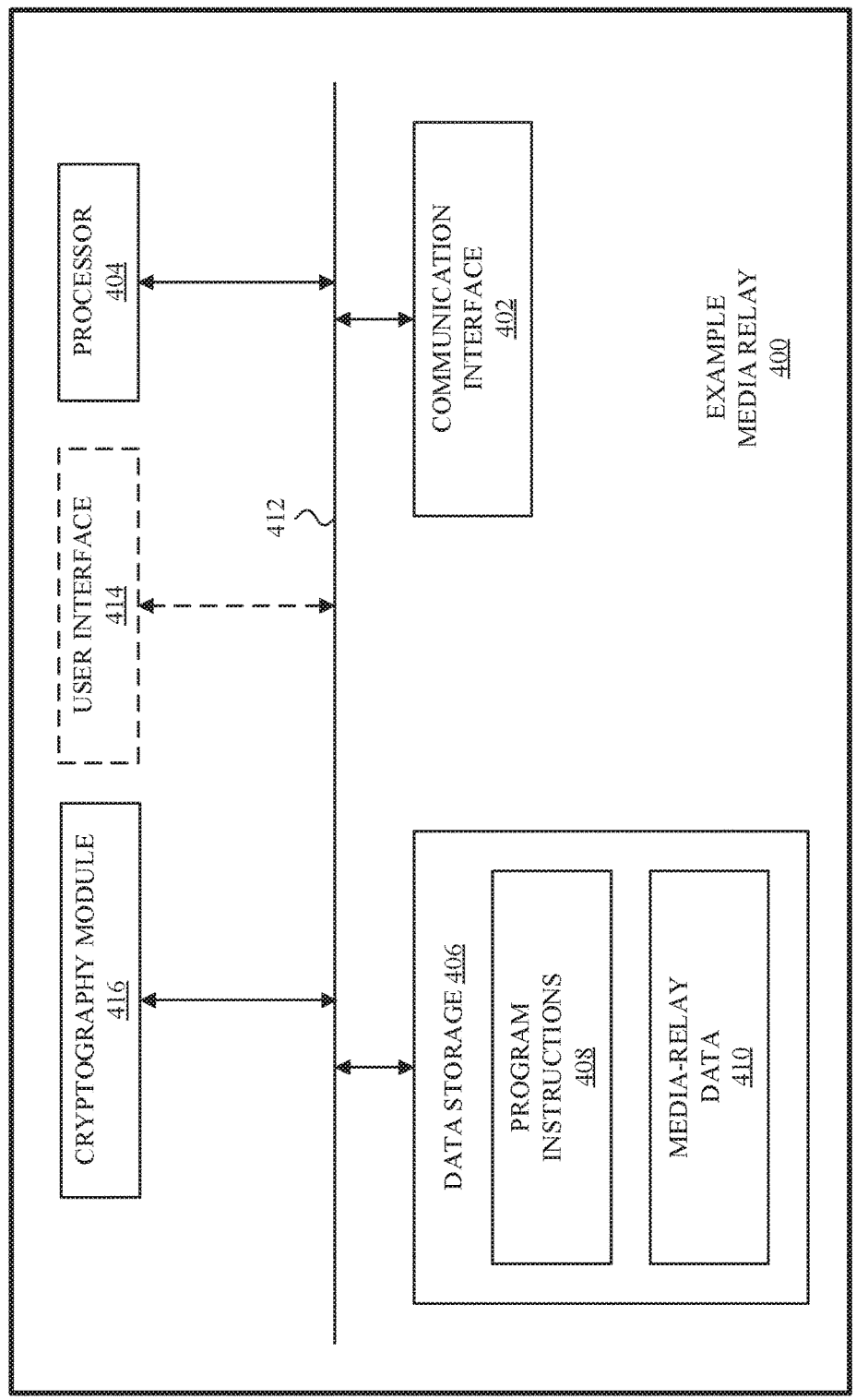
FIG. 4 depicts an example architecture of an example media relay, in accordance with at least one embodiment.

FIG. 4 depicts an example architecture of an example media relay, in accordance with at least one embodiment. In particular, FIG. 4 depicts an example media relay 400 (which could represent the authorized media relay 102) as including a communication interface 402, a processor 404, data storage 406 containing program instructions 408 and media-relay data 410, a system bus 412, an optional user interface 414, and a cryptography module 416. This architecture is presented by way of example and not limitation.

The communication interface 402 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the communication interface 402 may include any necessary hardware (e.g., chipsets, antennas, Ethernet cards, etc.), any necessary firmware, and any necessary software for conducting one or more forms of communication with one or more other entities. It is noted that the communication interface 402 may be or may be included in the communication module that is described herein as being part of a media relay in some embodiments, as may the processor 404 and any other necessary components.

The processor 404 may include one or more processors of any type deemed suitable by those of skill in the relevant art, some examples including a general-purpose microprocessor and a dedicated digital signal processor (DSP).

The data storage 406 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 406 contains program instructions 408 that are executable by the processor 404 for carrying out various media-relay functions described herein. The data storage 406 also contains media-relay data 410, which could include any variables, values, and/or other data that is accessed by, read from, written to, and/or the like by the example media relay 400 when carrying out one or more of the various media-relay functions described herein.

The user interface 414 may be present in some media relays 400 and not present in other media relays 400. When present, the user interface 414 may include one or more input devices (a.k.a. components and the like) and/or one or more output devices (a.k.a. components and the like). With respect to input devices, the user interface 414 may include one or more touchscreens, buttons, switches, knobs, microphones, and the like. With respect to output devices, the user interface 414 may include one or more displays, speakers, light emitting diodes (LEDs), and the like. Moreover, one or more components (e.g., an interactive touchscreen-and-display component) of the user interface 414 could provide both user-input and user-output functionality. And certainly other user-interface components could be used in a given context, as known to those of skill in the art.

The cryptography module 416 may include any preconfigured data, encryption and decryption algorithms, processors, memory, and/or any other hardware components and instructions deemed suitable by those of skill in the relevant art for carrying out the one or more cryptographic functions described herein as being carried out by a media relay 400. Thus, as an example, and as is described more fully below, the cryptography module 416 may be preconfigured with a first-key secret useable by the media relay 400 for identifying a first key and a second-key secret useable by the media relay 400 for identifying a second key.

Figure 5:
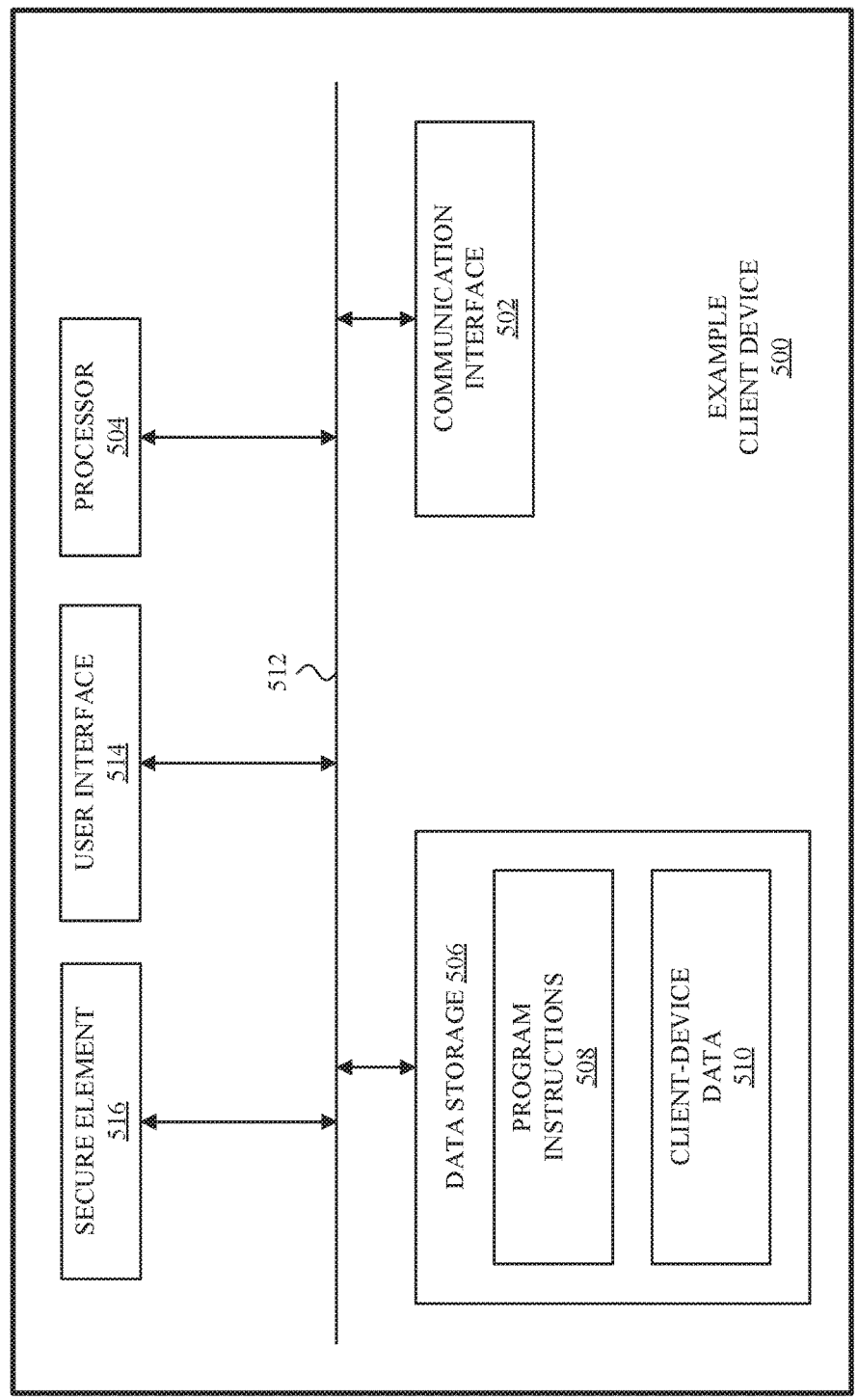
FIG. 5 depicts an example architecture of an example client device having an associated secure element, in accordance with at least one embodiment.

FIG. 5 depicts an example client device, in accordance with at least one embodiment. In particular, FIG. 5 depicts an example architecture of an example client device 500. In at least one embodiment, each of the client devices 106 and 108 have an internal architecture that is substantially the same as the example architecture of the example client device 500 that is depicted in FIG. 5. As shown, the client device 500 includes a communication interface 502, a processor 504, a data storage 506 that contains program instructions 508 and client-device data 510, a system bus 512, a user interface 514, and a secure element 516. Other architectures could be used in various different implementations as deemed suitable by those of skill in the art.

It is noted that the communication interface 502, the processor 504, the data storage 506, the system bus 512, and the user interface 514 could each take a form that matches the above description of the respective counterpart component of the example media relay 400 of FIG. 4. Naturally, the program instructions 508 are executable by the processor 504 for carrying out various client-device functions described herein, and the client-device data 510 could include any variables, values, and/or other data that is accessed by, read from, written to, and/or the like by the example client device 500 when carrying out one or more of the client-device functions described herein.

The secure element 516 is depicted in FIG. 5 as being an integral component of the client device 500. This is one possibility, though certainly other configurations exist. For example, the secure element 516 could be part of an accessory (e.g., headset) that is connected in a wired or wireless fashion with the client device 500. As another example, the secure element could have a form factor of a microSD card or SIM card and accordingly be connected to the system bus 512 of the client device 500 by a suitable interface. And certainly other possibilities exist as well. The secure element 516 may include any processors, memory, instructions, encryption and decryption algorithms, and/or any other resources deemed suitable by those of skill in the art for carrying out the secure-element functions described herein.

III. Examples of Operation

It is noted that a number of session examples are described below in connection with FIGS. 6A, 6B, 7A, 7B, 8A, 8B, 9A, 9B, 10A, and 10B. Each A-B pair of such figures begins with an "A" figure that depicts the two endpoints of the corresponding session as being secure elements that communicate with one another via respective communication devices, similar to the arrangement that is depicted in FIG. 1 (though, for clarity of presentation, the communication devices themselves are not explicitly depicted in the "A" figures). Furthermore, each A-B pair of figures also includes a "B" figure that depicts the two endpoints of the corresponding session as being software applications (e.g., Skype®, Whatsapp®, and/or the like) that are executing on respective communication devices.

Other depictions could be included in which one or both endpoints to the respective communication sessions are the communication devices themselves, perhaps with embedded secure elements, perhaps with encryption/decryption capabilities in the hardware and/or operating system of the device itself. And certainly other examples could be listed. Furthermore, communication sessions could involve one or more endpoints of one of these types, one or more other endpoints of another one of these types, etc. In other words, the two or more endpoints to a given session need not be of the same exact hardware/software configuration as one another.

Figure 11A:
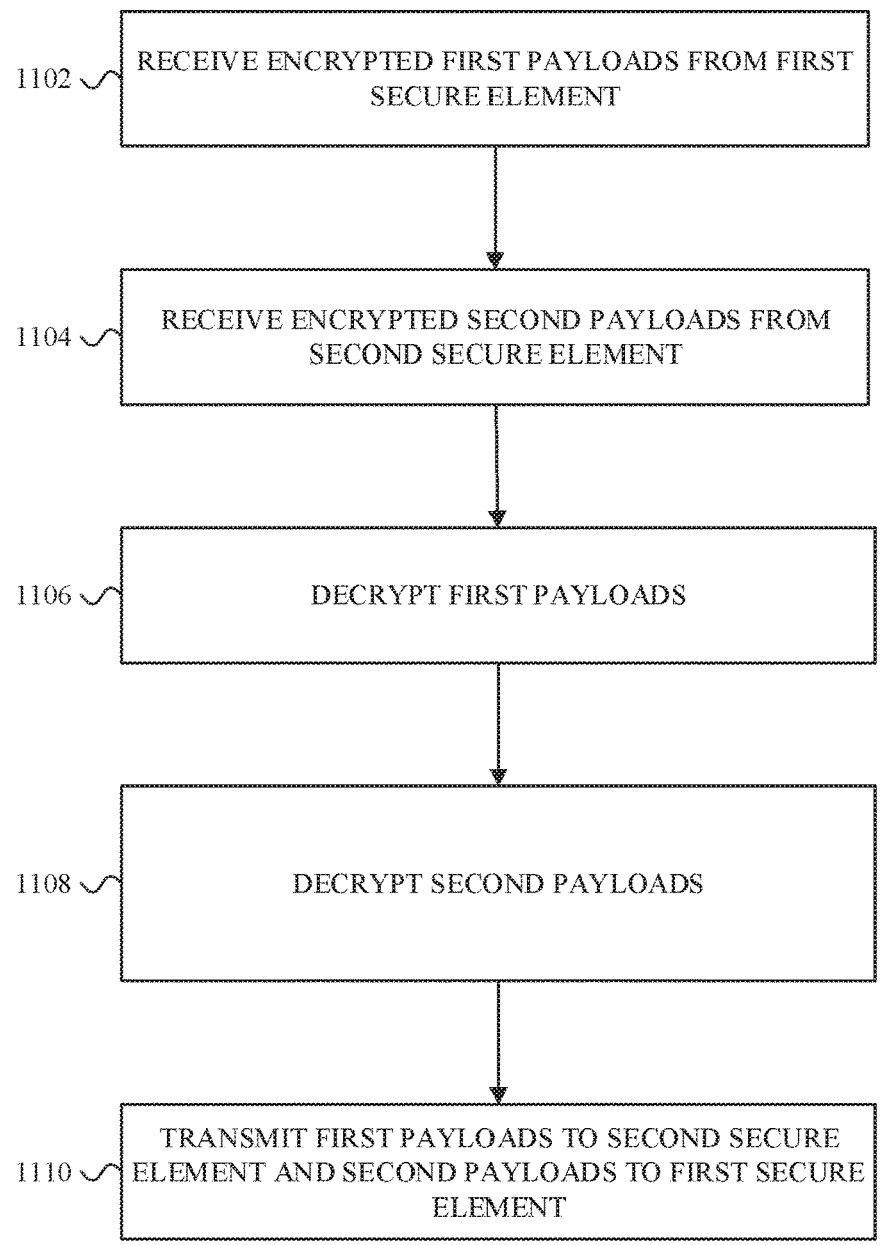
FIG. 11A depicts a first example method, in accordance with at least one embodiment.
Figure 11B:
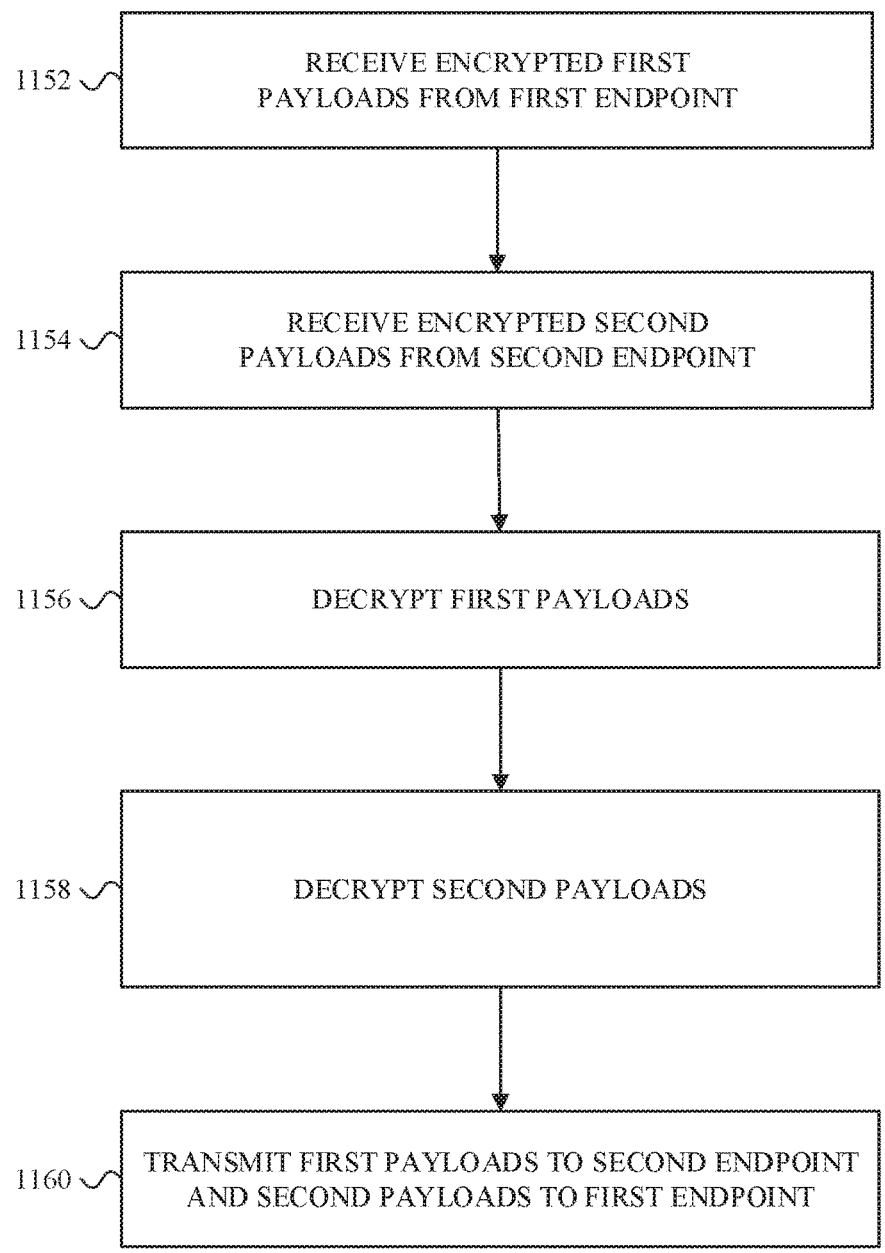
FIG. 11B depicts a second example method, in accordance with at least one embodiment.

In cases of secure elements being utilized, such secure elements could take the form of the above-described secure element 516 or perhaps another form. Some secure-element types that are known to those of skill in the relevant art include Trusted Execution Environments (TEEs), pure hardware solutions, pure software solutions, and hybrid hardware-software solutions, as examples. Moreover, as described below, FIG. 11A depicts a method in which both endpoints are secure elements, whereas FIG. 11B depicts a similar method in which both endpoints are specified only as endpoints, either or both of which could be a secure element, an application executing on a secure element, an application executing on a communication device, a communication device, a pure hardware endpoint, a pure software endpoint, a hybrid hardware-software endpoint, a firmware endpoint, and/or the like.

Figure 6A:
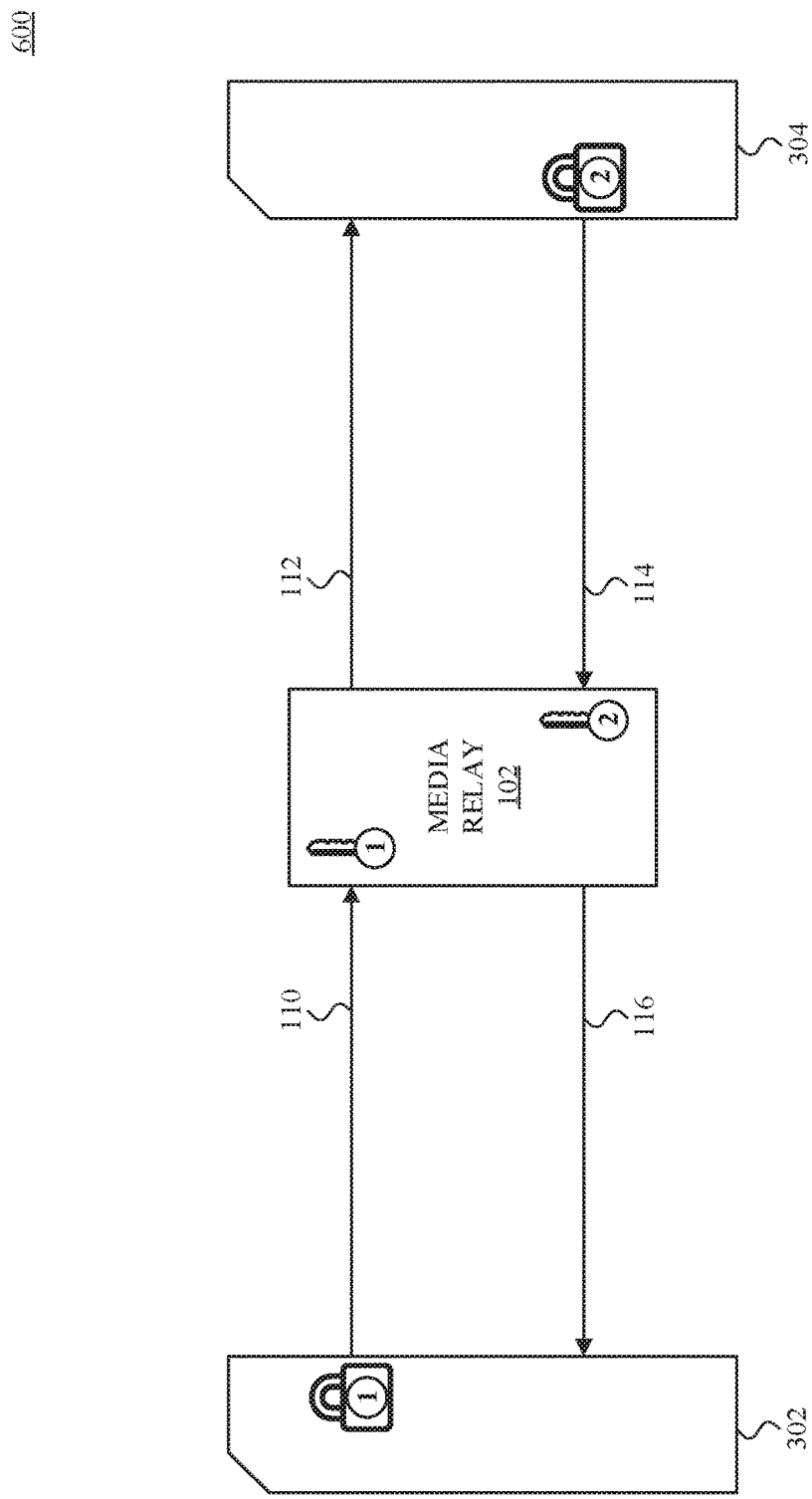
FIG. 6A depicts a first session example with enforced routing, in accordance with at least one embodiment.

FIG. 6A depicts a first session example with enforced routing, in accordance with at least one embodiment. In particular, FIG. 6A depicts a session 600 where routing via the authorized media relay 102 is enforced in accordance with the present methods and systems by way of leg-specific encryption of various legs of the session 600 between the endpoints and the media relay 102. As mentioned above, for simplicity, in FIGS. 6A, 7A, 8A, 9A, and 10A, the endpoints of the session are shown as being the secure elements 302 and 304 though it is to be understood that, as is the case in FIG. 3, the respective associated client devices 106 and 108 could be there as well.

As shown in the session 600, the secure element 302 encrypts the stream 110 such that decryption of the encrypted stream 110 requires a first key, which the media relay 102 has. Moreover, the secure element 304 encrypts the stream 114 such that decryption of the encrypted stream 114 requires a second key, which the media relay 102 also has. In an embodiment, the secure element 302 encrypts the stream 110 with a public key of the media relay 102, which then decrypts the encrypted stream 110 using its (i.e., the media relay 102's) corresponding private key. In an embodiment, the secure element 304 encrypts the stream 114 with the same or a different public key of the media relay 102, which then decrypts the encrypted stream 114 using its (i.e., the media relay 102's) corresponding (same or different) private key. In an embodiment in which both the secure element 302 and the secure element 304 encrypted their respective outbound streams 110 and 114 using the same key (e.g., a particular public key of the media relay 102), FIG. 6A could just as well be shown with the same symbol (e.g., a "1") in both lock icons and both key icons. Such variations will be understood by those having skill in the art.

It is noted that, by virtue of the fact that the secure element 302 encrypts the stream 110 using the first key and the secure element 304 encrypts the stream 114 using the second key, routing via the media relay 102 is enforced in that routing via a different media relay is rendered pointless by the fact that the media relay 102 has the first and second keys and unauthorized media relays do not. Thus, the packets aren't actually forced to go through the media relay 102, but if the participants want to engage in a successful communication session, the packets being routed via the media relay 102 is the only viable option.

Figure 6B:
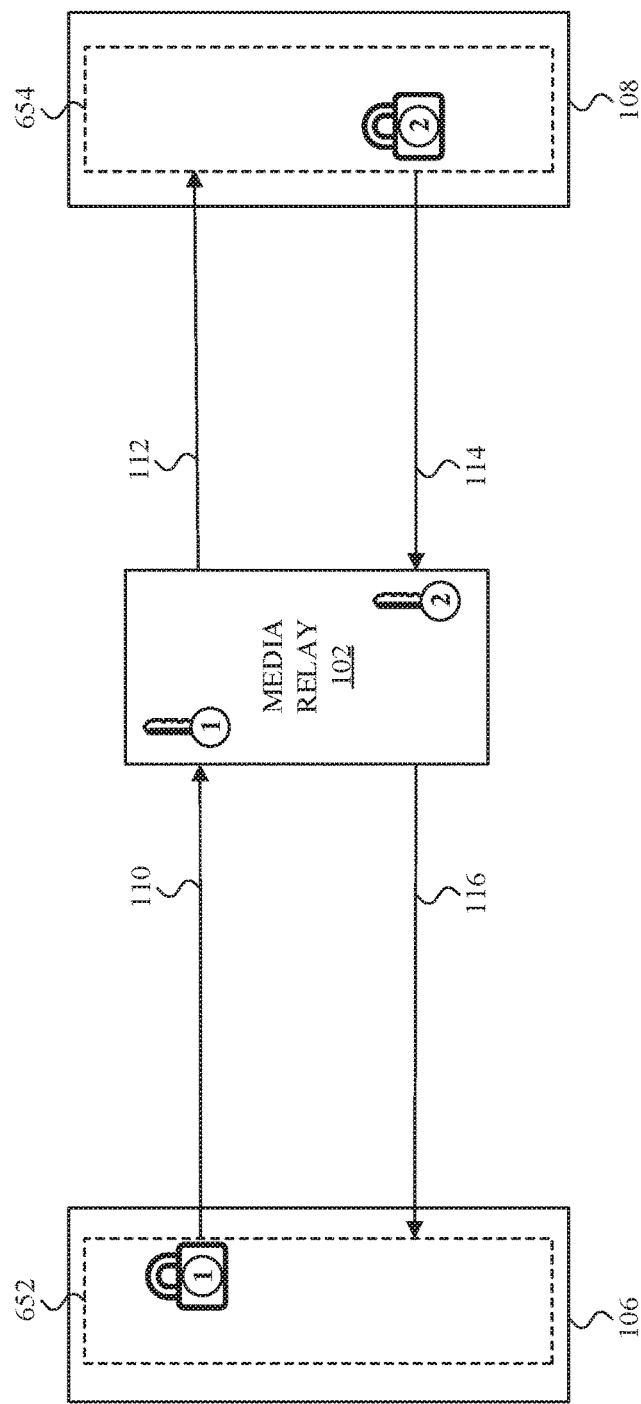
FIG. 6B depicts a second session example with enforced routing, in accordance with at least one embodiment.

FIG. 6B depicts a second session example with enforced routing, in accordance with at least one embodiment. In particular, FIG. 6B depicts a session 650 that is substantially the same as the session 600 of FIG. 6A, other than that the endpoints to the session are a software application 652 executing on the communication device 106 and a software application 654 executing on the communication device 108. In various different embodiments, in this figure and/or in others, either or both of the software applications could be or include example applications such as Skype®, Whatsapp®, and/or the like.

Figure 7A:
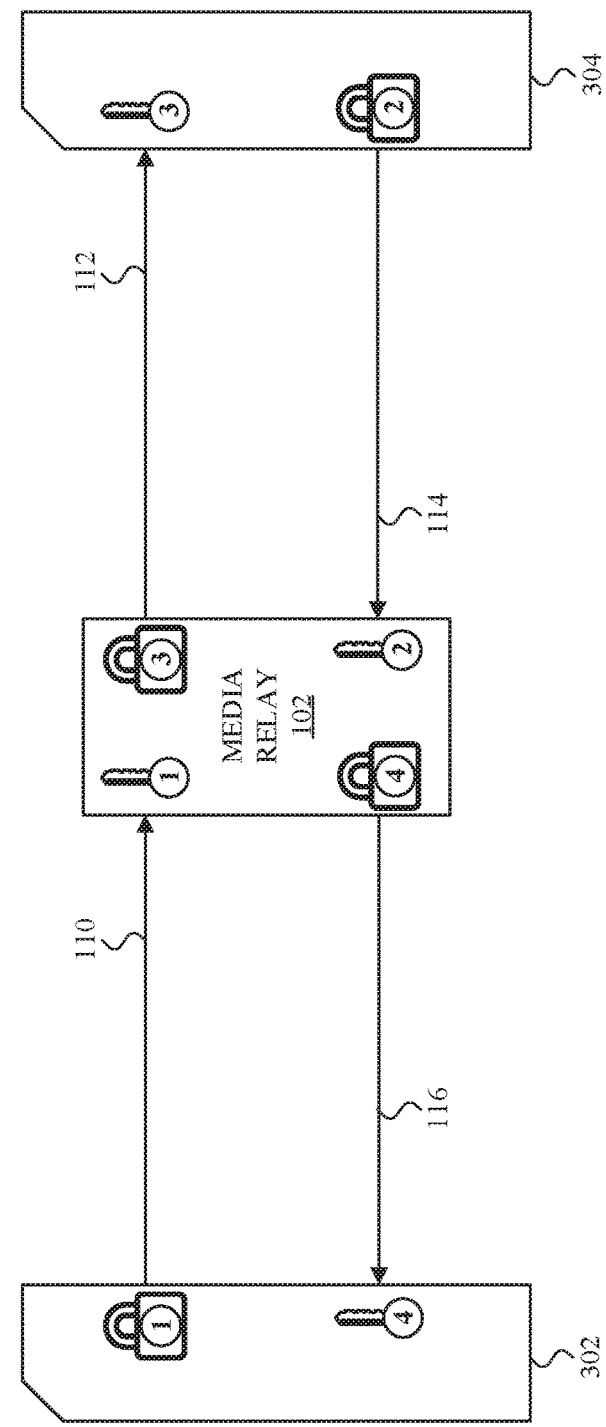
FIG. 7A depicts a third session example with enforced routing, in accordance with at least one embodiment.

FIG. 7A depicts a third session example with enforced routing, in accordance with at least one embodiment. In particular, FIG. 7A depicts a session 700 that is similar in many ways to the session 600, other than, as shown, the media relay 102 re-encrypts the payloads from the stream 110 such that decryption of the encrypted stream 112 requires a third key, which the second secure element 304 has. Moreover, the media relay 102 also re-encrypts the payloads from the stream 114 such that decryption of the encrypted stream 116 requires a fourth key, which the first secure element has. In an embodiment, the media relay 102 encrypts the stream 114 with a public key of the second secure element 304, which then uses its corresponding private key to decrypt, and the media relay 102 encrypts the stream 116 with a public key of the first secure element 302, which then uses its corresponding private key to decrypt.

Figure 7B:
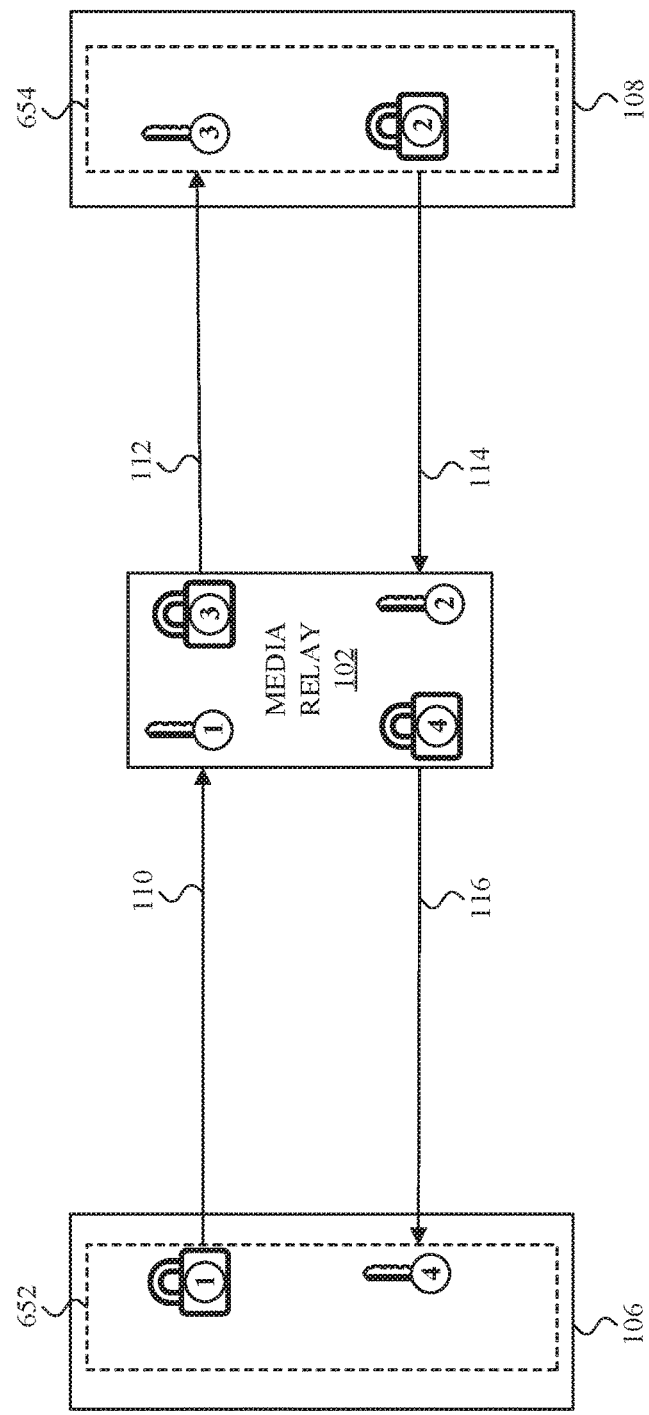
FIG. 7B depicts a fourth session example with enforced routing, in accordance with at least one embodiment.

FIG. 7B depicts a fourth session example with enforced routing, in accordance with at least one embodiment. The example session 750 differs from the example session 700 in substantially the same ways that the example session 650 differs from the example session 600.

Figure 8A:
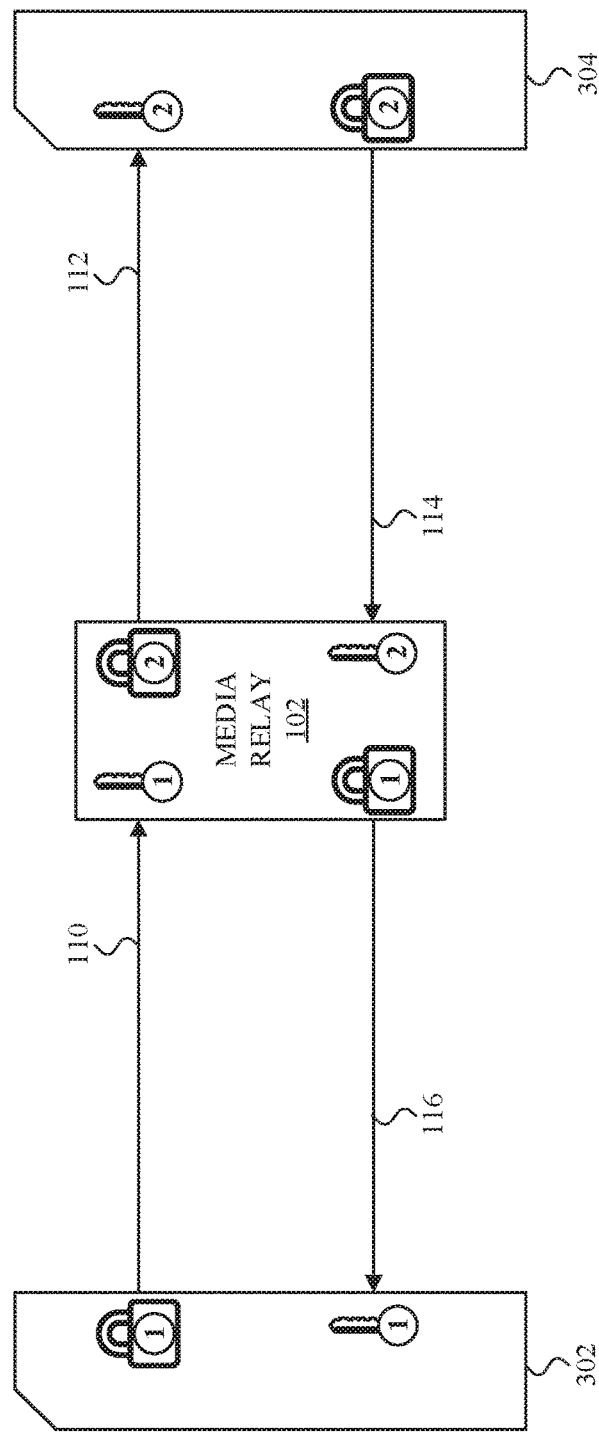
FIG. 8A depicts a fifth session example with enforced routing, in accordance with at least one embodiment.

FIG. 8A depicts a fifth session example with enforced routing, in accordance with at least one embodiment. In particular, FIG. 8A depicts a session 800 that is quite similar to the session 700, other than that (i) a first symmetric-key relationship (based on a first key) exists between the first secure element 302 and the media relay 102 and (ii) a second symmetric-key relationship (based on a second key) exists between the media relay 102 and the second secure element 304. Thus, when setting up the session, each respective secure element may be configured to proceed with the session only if a symmetric-key relationship is set up between the respective secure element and an authorized media relay.

Figure 8B:
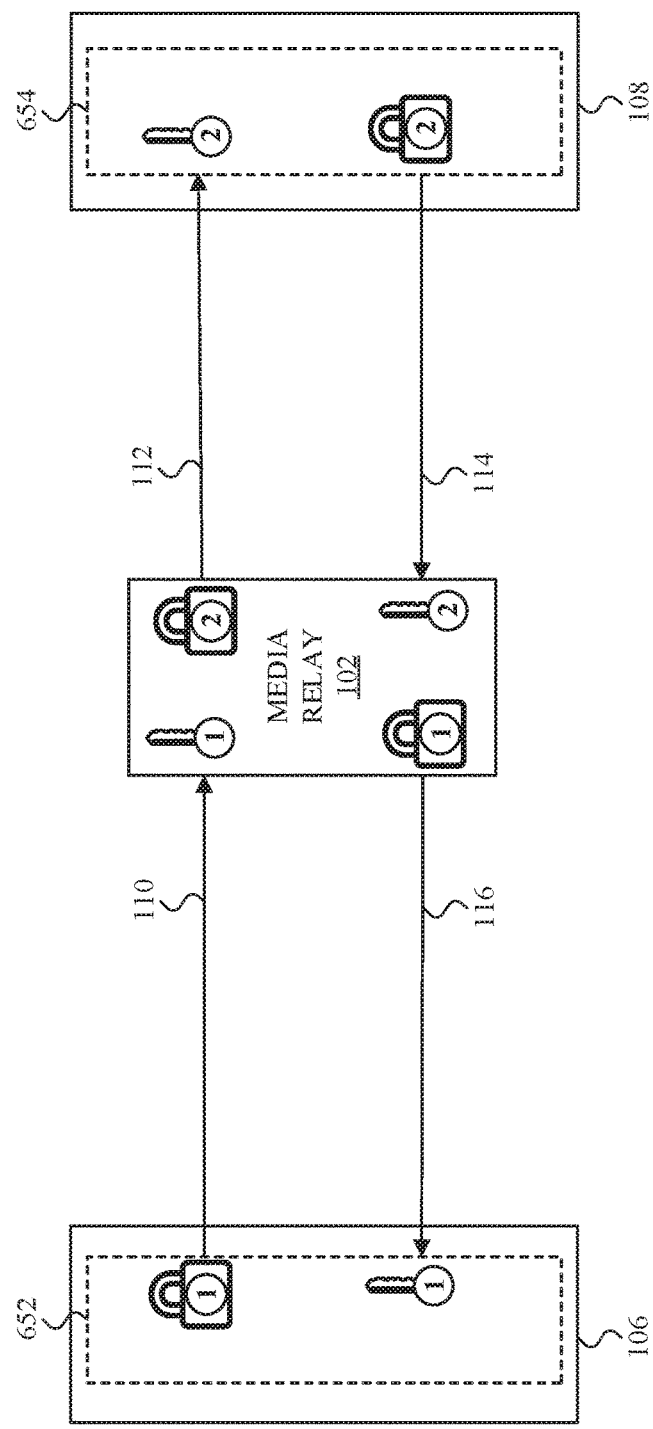
FIG. 8B depicts a sixth session example with enforced routing, in accordance with at least one embodiment.

FIG. 8B depicts a sixth session example with enforced routing, in accordance with at least one embodiment. The example session 850 differs from the example session 800 in substantially the same ways that the example session 650 differs from the example session 600.

FIG. 9A depicts a seventh session example with enforced routing, legal intercept, and end-to-end encryption, in accordance with at least one embodiment. In particular, FIG. 9A depicts a session 900 that involves both legal intercept and end-to-end encryption in conjunction with the herein-described enforced routing. The session 900 is similar in many ways to the session 800, though of course with the addition of the LEA server 118 receiving the copy streams 110C and 114C. Like the session 800, the session 900 in involves (i) a first symmetric-key relationship (based on a first key) between the first secure element 302 and the media relay 102 and (ii) a second symmetric-key relationship (based on a second key) between the media relay 102 and the second secure element 304.

However, unlike the session 800, the session 900 also involves the first secure element 302 adding another layer of encryption (based on a third key) to the outbound stream 110, and further involves the second secure element 304 adding another layer of encryption (based on a fourth key) to the outbound stream 114. As shown, the first secure element has the fourth key and the second secure element has the third key; moreover, the LEA server 118 has the third and fourth keys, but the media relay 102 has neither the third key nor the fourth key. Thus, only the parties to the session and the LEA server 118 can fully decrypt the communications; it is noted that, in this embodiment, the media relay 102 does not add an additional layer of encryption on top of the copy streams 110C and 114C prior to transmitting those copy streams to the LEA server 118, though it certainly could.

FIG. 9B depicts an eighth session example with enforced routing, legal intercept, and end-to-end encryption, in accordance with at least one embodiment. The example session 950 differs from the example session 900 in substantially the same ways that the example session 650 differs from the example session 600.

Figure 10A:
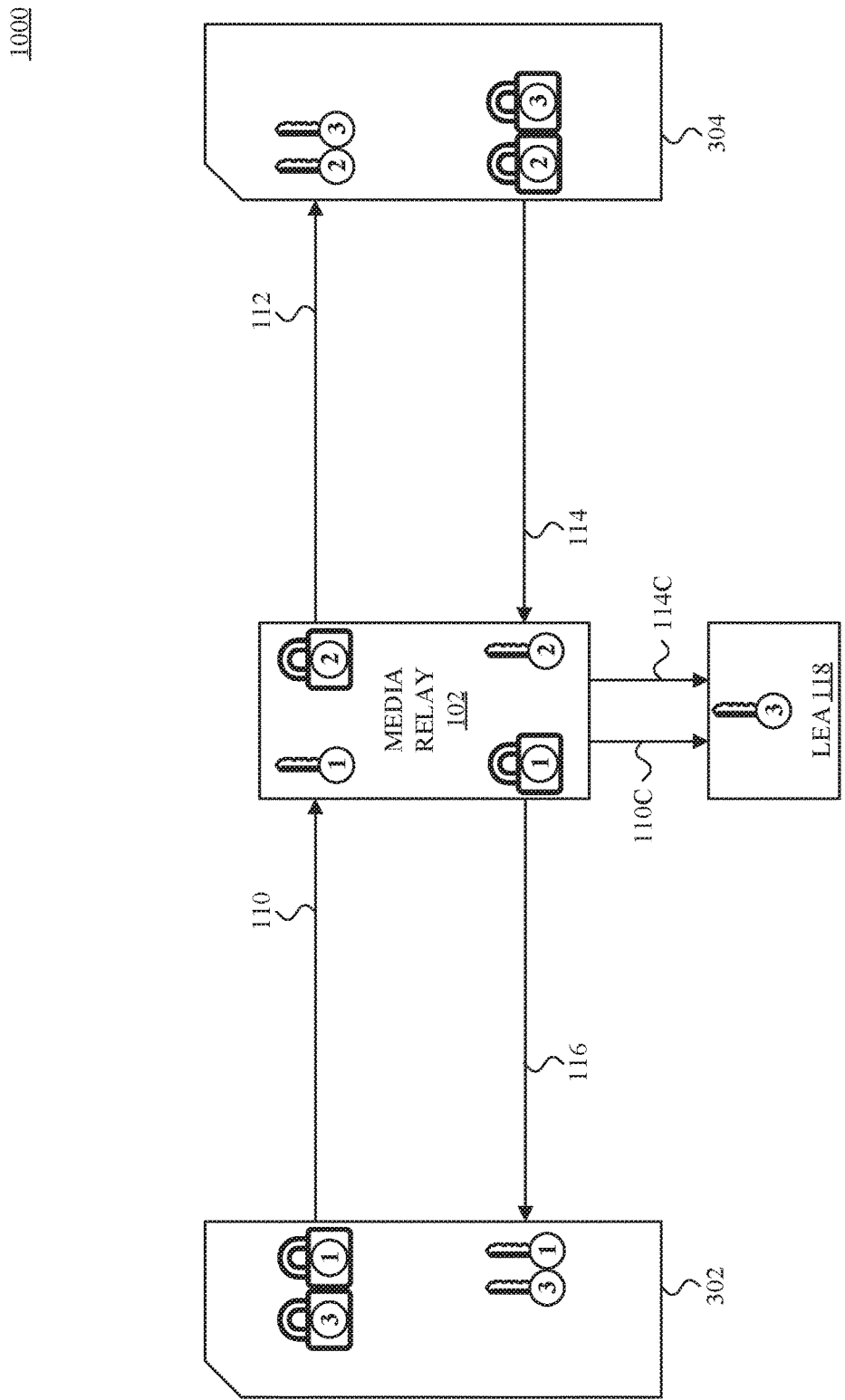
FIG. 10A depicts a ninth session example with enforced routing, legal intercept, and end-to-end encryption, in accordance with at least one embodiment.

FIG. 10A depicts a ninth session example with enforced routing, legal intercept, and end-to-end encryption, in accordance with at least one embodiment. In particular, FIG. 10A depicts a session 1000 that is similar in many ways to the session 900, other than that the end-to-end encryption of the session is symmetric (based on a third key).

Figure 10B:
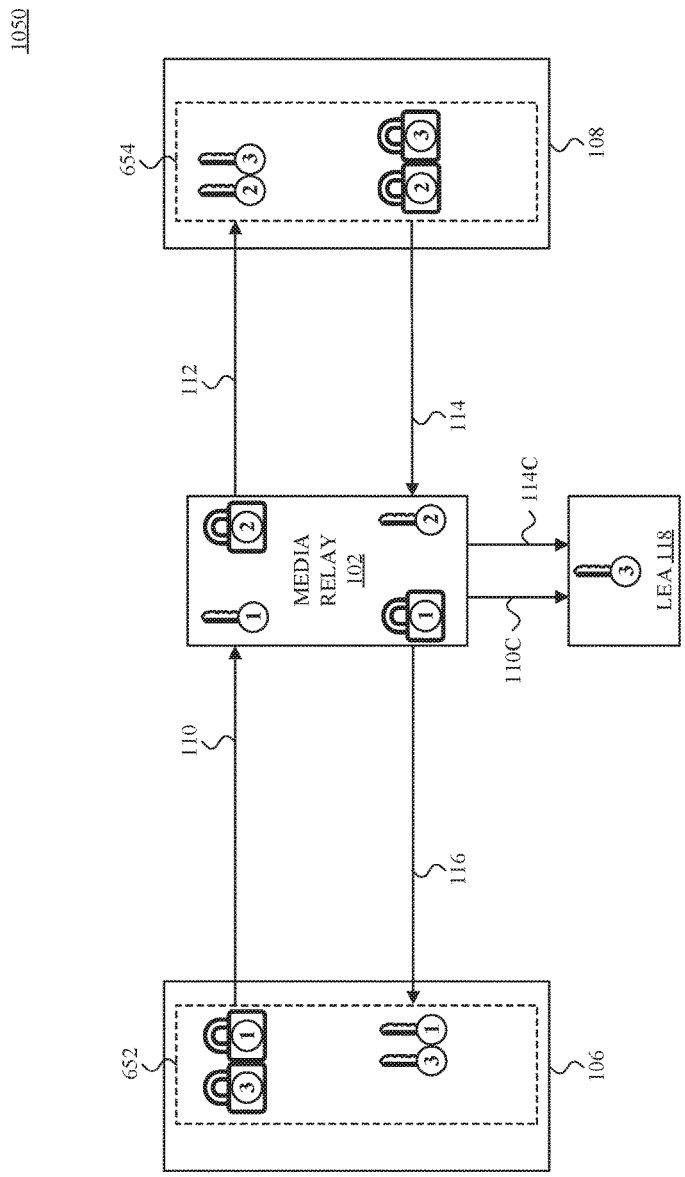
FIG. 10B depicts a tenth session example with enforced routing, legal intercept, and end-to-end encryption, in accordance with at least one embodiment.

FIG. 10B depicts a tenth session example with enforced routing, legal intercept, and end-to-end encryption, in accordance with at least one embodiment. The example session 1050 differs from the example session 1000 in substantially the same ways that the example session 650 differs from the example session 600.

FIG. 11A depicts a first example method, in accordance with at least one embodiment. In particular, FIG. 11A depicts a method 1100 that is described herein by way of example as being carried out by the media relay 102, though this is by way of example and not limitation, as any computing and communication device that is suitably equipped, programmed, and configured could be used to carry out the media-relay functions described herein. Moreover, it is noted that each of the sessions that are depicted in FIGS. 6A-10B could be understood as involving the media relay carrying out the basic method 1100 (i.e., the steps 1102-1110) that are further described below. As will be understood by those having skill in the art with the benefit of this disclosure, the sessions of FIGS. 6A and 6B are a relatively more basic case, while each of the sessions of FIGS. 7A-10B add one or more additionally complex aspects to that basic case.

At step 1102, the media relay 102 receives encrypted first payloads 110 from the first secure element 302 in connection with a session. The encrypted first payloads 110 have been encrypted in the first secure element 302 such that decryption of the encrypted first payloads 110 requires a first key. Moreover, the media relay 102 has been preconfigured prior to the session with a first-key secret useable by the media relay 102 for identifying the first key. In some embodiments, the first-key secret is in fact the first key; in other embodiments, the first-key secret is a value from which the media relay 102 is configured to be able to derive the first key. Such is the case with all other key secrets (i.e., second-key secret, third-key secret, etc.) that are mentioned in this disclosure.

In at least one embodiment, the first secure element 302 is associated with the first client device 106 as shown above in FIG. 3. In such an arrangement, step 1102 may involve the media relay 102 receiving the encrypted first payloads 110 from the first secure element 302 via the first client device 106; in at least one such embodiment, the first client device 106 does not have the first key.

At step 1104, the media relay 102 receives encrypted second payloads 114 from the second secure element 304 in connection with the session. The encrypted second payloads 114 have been encrypted in the second secure element 304 such that decryption of the encrypted second payloads 114 requires a second key. The media relay 102 has been preconfigured prior to the session with a second-key secret useable by the media relay for identifying the second key.

In at least one embodiment, the second secure element 304 is associated with the second client device 108 as shown above in FIG. 3. In such an arrangement, step 1104 may involve the media relay 102 receiving the encrypted second payloads 114 from the second secure element 304 via the second client device 108; in at least one such embodiment, the second client device 108 does not have the second key.

At step 1106, the media relay 102 generates decrypted first payloads at least in part by using the first key to decrypt the encrypted first payloads 110. In this step and in any encryption or decryption step, any suitable encryption/decryption algorithms could be used, including but not limited to those mentioned in this disclosure. Moreover, it is explicitly noted that different legs of the session could be encrypted using different encryption technologies, algorithms, and the like (e.g., one could use AES while another uses 3DS, etc.).

At step 1108, the media relay 102 generates decrypted second payloads at least in part by using the second key to decrypt the encrypted second payloads 114.

At step 1110, the media relay 102 (i) transmits the first payloads to the second secure element 304 (at 112) and (ii) transmits the second payloads to the first secure element 302 (at 116) in connection with the first session.

It is noted that, in some embodiments, the media relay 102 does not re-encrypt the payloads before retransmitting them at 112 and 116. In other embodiments, the media relay 102 does re-encrypt the payloads before retransmitting them to the secure elements 302 and 304 at 112 and 116, respectively. The routing via the media relay 102 of the complete set of session data is accomplished by the encryption and decryption at the beginning and end of the legs 110 and 114. It may well be advantageous from an engineering and design standpoint to encrypt the legs 112 and 116 as well, and a number of possibilities for doing so are discussed in various parts of this disclosure. It may be desirable to enforce the routing of the session via the media relay 102 for law-enforcement-intercept purposes as described above, though certainly there may be other purposes as well or instead, such as but not limited to billing purposes, tracking purposes, report-creation purposes, statistics-generation purposes, testing purposes, and/or one or more other purposes deemed suitable by those having skill in the relevant art.

FIG. 11B depicts a second example method, in accordance with at least one embodiment. Thus, it is noted that some embodiments, such as the example method 1150 that is depicted in FIG. 11B, take the form of methods similar to the method 1100 but that do not necessarily involve a respective physical secure element at each endpoint of the session. Similarly, some embodiments take the form of a media relay that is equipped, programmed, and configured to carry out such a method. Thus, one or both of the endpoints to a given session could be a communication device that does its own encryption, or perhaps an encryption-based communication application executing on a computer, tablet, smartphone, or the like. As such, in an embodiment, a method involves the steps of: (i) a media relay receiving encrypted first payloads from a first endpoint in connection with a first session, the encrypted first payloads having been encrypted such that decryption of the encrypted first payloads requires a first key, the media relay having been preconfigured prior to the first session with a first-key secret useable by the media relay for identifying the first key; (ii) the media relay receiving encrypted second payloads from a second endpoint in connection with the first session, the encrypted second payloads having been encrypted such that decryption of the encrypted second payloads requires a second key, the media relay having been preconfigured prior to the first session with a second-key secret useable by the media relay for identifying the second key; (iii) the media relay generating decrypted first payloads at least in part by using the first key to decrypt the encrypted first payloads;

(iv) the media relay generating decrypted second payloads at least in part by using the second key to decrypt the encrypted second payloads; and (v) the media relay transmitting the first payloads to the second endpoint and the second payloads to the first endpoint in connection with the first session. It is explicitly noted that, unless context dictates an incompatibility, all of the variations and permutations discussed in this disclosure are applicable to these embodiments as well. The steps 1152-1160 of the method 1150 parallel the steps 1102-1110 of the method 1100.

Moreover, in a similar way, an embodiment takes the form of a media relay that includes (i) a cryptography module preconfigured with a first-key secret useable by the media relay for identifying a first key and a second-key secret useable by the media relay for identifying a second key; and (ii) a communication module configured to (a) receive encrypted first payloads from a first endpoint in connection with a first session, the encrypted first payloads having been encrypted such that decryption of the encrypted first payloads requires the first key; (b) receive encrypted second payloads from a second endpoint in connection with the first session, the encrypted second payloads having been encrypted such that decryption of the encrypted second payloads requires the second key; and (c) pass the received encrypted first payloads and the received encrypted second payloads to the cryptography module; moreover, the cryptography module is configured to (a) generate decrypted first payloads at least in part by using the first key to decrypt the encrypted first payloads; (b) generate decrypted second payloads at least in part by using the second key to decrypt the encrypted second payloads; and (c) pass the decrypted first payloads and the decrypted second payloads to the communication module; moreover, the communication module is further configured to transmit the first payloads to the second endpoint and the second payloads to the first endpoint. Furthermore, it is also the case with these embodiments that, unless context dictates an incompatibility, all of the variations and permutations discussed in this disclosure are applicable to these embodiments as well.

Figure 12:
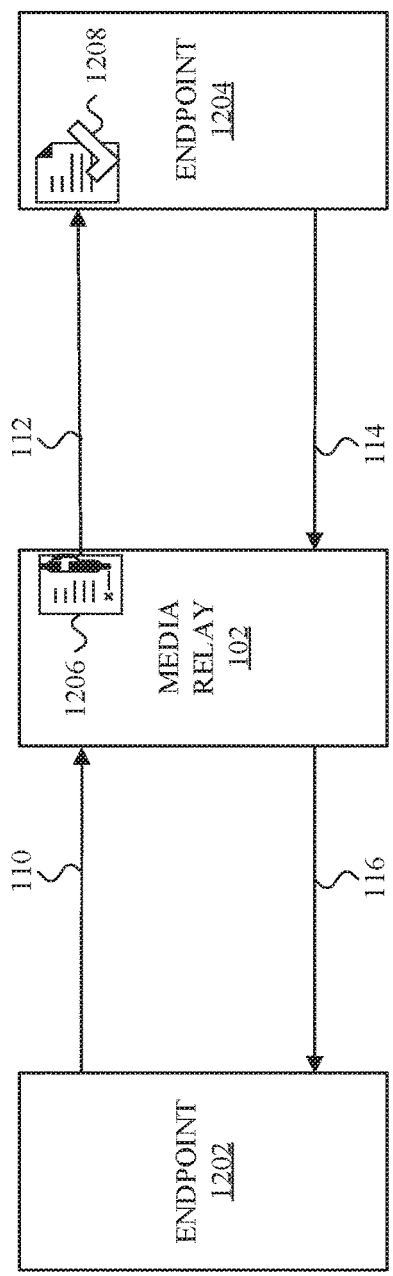
FIG. 12 depicts an eleventh session example with enforced routing via media-relay authentication, in accordance with at least one embodiment.

IV. Examples of Embodiments Involving Enforcing Routing of Sessions Via Authorized Media Relays at Least in Part By Using Media-Relay Authentication FIG. 12 depicts an eleventh session example with enforced routing via media-relay authentication, in accordance with at least one embodiment. In particular, FIG. 12 depicts a session 1200 where routing via the authorized media relay 102 is enforced in accordance with the present methods and systems by way of leg-based authentication with respect to at least one leg of the session. In the example that is depicted in FIG. 12, it is the stream 112 with respect to which media-relay authentication is performed. As can be seen in FIG. 12, the session 1200 involves an endpoint 1202 and an endpoint 1204 communicating with one another via the above-described media relay 102. Either or both of the endpoints 1202 and 1204 could be a secure element, a secure element communicating via a communication device, a communication device, an application and/or operating-system process executing on a communication device, and/or any other option described herein and/or deemed suitable by those of skill in the art for a given implementation.

In accordance with at least one embodiment, the media relay 102 adds its digital-authentication signature 1206 to packets in the stream 112 prior to transmitting those packets to the endpoint 1204, which then checks the authenticity of that signature as shown at 1208. If the signature is authentic, the endpoint 1204 may accordingly provide the bearer data via a user interface. If the signature is not authentic, however, or if no signature is present, the endpoint 1204 may take one or more actions such as silently discarding the media, terminating the session, and/or the like. In some embodiments, the stream 112 is encrypted. In other embodiments, the stream 112 is not encrypted. In embodiments in which the stream 112 is encrypted, the session may, with respect to encryption, have the arrangement of any of the above-described session examples or perhaps another arrangement deemed suitable by those of skill in the art. In this example as in all others presented herein, more than two endpoints may be participating in the session, as two are depicted for simplicity and not by way of limitation. As a general matter, the signing at 1206 by the media relay 102 and the verification at 1208 by the endpoint 1204 enforces routing of the session via the media relay 102 because routing via any other media relay would result in packets that the endpoint 1204 would not verify as authentic. It is noted that in instances of single-end authentication verification such as is depicted in FIG. 12, all of the endpoints to the session except for one would conduct the described authentication validation. A double-end (i.e., symmetric) example is described below.

Figure 13:
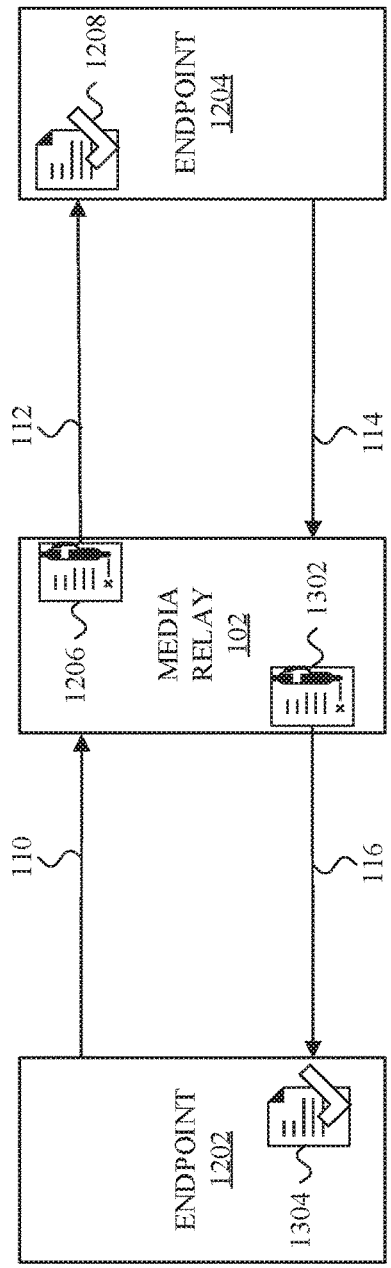
FIG. 13 depicts a twelfth session example with enforced routing via media-relay authentication, in accordance with at least one embodiment.

FIG. 13 depicts a twelfth session example with enforced routing via media-relay authentication, in accordance with at least one embodiment. In particular, FIG. 13 depicts an example session 1300 that is similar to the session 1200 of FIG. 12 other than that the media relay 102 also digitally signs the stream 116 at 1302 for authentication verification by the endpoint 1202 at 1304. As above, each of the streams 112 and 116 (as well as 110 and 114 for that matter) could be encrypted or unencrypted. The media relay 102 could use the same digital signature for signing the stream 112 at 1206 and the stream 116 at 1302, or different digital signatures. In any embodiments described herein in which signature authentication is used, a trusted signature authority such as VeriSign® may be used by the endpoint 1202, the endpoint 1204, and/or any other endpoint(s) to a particular session. Other trusted signature authorities, organizations, and/or the like could be used instead of or in addition. Moreover, it is not necessary that every endpoint to a given session use the same trusted signature authentication authority. And certainly numerous other possibilities could be described here as well.

V. Further Example Embodiments a. First Set of Further Example Embodiments

In at least one embodiment, the first payloads include first voice over Internet Protocol (VoIP) payloads; the second payloads include second VoIP payloads; and the first session includes a VoIP session.

In at least one embodiment, the first payloads include first video-chat payloads; the second payloads include second video-chat payloads; and the first session includes a video-chat session.

In at least one embodiment, the first secure element is associated with a first client device; receiving the encrypted first payloads from the first secure element includes receiving the encrypted first payloads from the first secure element via the first client device; and the first client device does not have the first key.

In at least one embodiment, the second secure element is associated with a second client device; receiving the encrypted second payloads from the second secure element includes receiving the encrypted second payloads from the second secure element via the second client device; and the second client device does not have the second key.

In at least one embodiment, the first-key secret is the first key.

In at least one embodiment, the second-key secret is the second key.

In at least one embodiment, the first and second keys are the same key.

In at least one embodiment, the first key is a first media-relay private key for which there is a corresponding first media-relay public key; and the encrypted first payloads having been encrypted in the first secure element such that decryption of the encrypted first payloads requires the first key includes the encrypted first payloads having been encrypted in the first secure element with the first media-relay public key.

In at least one embodiment, the second key is a second media-relay private key for which there is a corresponding second media-relay public key; and the encrypted second payloads having been encrypted in the second secure element such that decryption of the encrypted second payloads requires the second key includes the encrypted second payloads having been encrypted in the second secure element with the second media-relay public key.

In at least one embodiment, the first media-relay private key and the second media-relay private key are the same private key; and the first media-relay public key and the second media-relay public key are the same public key.

In at least one embodiment, the first media-relay private key and the second media-relay private key are different private keys; and the first media-relay public key and the second media-relay public key are different public keys.

In at least one embodiment, the first key is a first shared key between the first secure element and the media relay; and the encrypted first payloads having been encrypted in the first secure element such that decryption of the encrypted first payloads requires the first key includes the encrypted first payloads having been encrypted in the first secure element with the first shared key. In at least one embodiment, the first secure element was preconfigured prior to the first session with the first shared key. In at least one embodiment, the first secure element was preconfigured prior to the first session with a secret useable by the first secure element for identifying the first shared key. In at least one embodiment, the first secure element includes at least one tamper-resistant safeguard with respect to at least the first shared key.

In at least one embodiment, the second key is a second shared key between the second secure element and the media relay; and the encrypted second payloads having been encrypted in the second secure element such that decryption of the encrypted second payloads requires the second key includes the encrypted second payloads having been encrypted in the second secure element with the second shared key. In at least one embodiment, the second secure element was preconfigured prior to the first session with the second shared key. In at least one embodiment, the second secure element was preconfigured prior to the first session with a secret useable by the second secure element for identifying the second shared key. In at least one embodiment, the second secure element includes at least one tamper-resistant safeguard with respect to at least the second shared key.

In at least one embodiment, the method also includes (i) the media relay generating re-encrypted first payloads at least in part by re-encrypting the decrypted first payloads with the second shared key and (ii) the media relay generating re-encrypted second payloads at least in part by re-encrypting the decrypted second payloads with the first shared key; and transmitting the first payloads to the second secure element comprises transmitting the re-encrypted first payloads to the second secure element; and transmitting the second payloads to the first secure element comprises transmitting the re-encrypted second payloads to the first secure element.

In at least one embodiment, the method also includes (i) the media relay generating re-encrypted first payloads at least in part by re-encrypting the decrypted first payloads such that decryption of the re-encrypted first payloads requires a third key, where the second secure element is preconfigured with a third-key secret useable by the second secure element for identifying the third key and (ii) the media relay generating re-encrypted second payloads at least in part by re-encrypting the decrypted second payloads such that decryption of the re-encrypted second payloads requires a fourth key, where the first secure element is preconfigured with a fourth-key secret useable by the first secure element for identifying the fourth key; and transmitting the first payloads to the second secure element includes transmitting the re-encrypted first payloads to the second secure element; and transmitting the second payloads to the first secure element includes transmitting the re-encrypted second payloads to the first secure element.

In at least one embodiment, the third key is a second-secure-element private key for which there is a corresponding second-secure-element public key; and re-encrypting the decrypted first payloads such that decryption of the re-encrypted first payloads requires the third key includes re-encrypting the decrypted first payloads with the corresponding second-secure-element public key. In at least one embodiment, the third-key secret is the third key.

In at least one embodiment, the fourth key is a first-secure-element private key for which there is a corresponding first-secure-element public key; and re-encrypting the decrypted second payloads such that decryption of the re-encrypted second payloads requires the fourth key includes re-encrypting the decrypted second payloads with the corresponding first-secure-element public key. In at least one embodiment, the fourth-key secret is the fourth key.

In at least one embodiment, the third key is a third shared key between the second secure element and the media relay; and re-encrypting the decrypted first payloads such that decryption of the re-encrypted first payloads requires the third key includes re-encrypting the decrypted first payloads with the third shared key. In at least one embodiment, the second secure element was preconfigured prior to the first session with the third shared key. In at least one embodiment, the second secure element was preconfigured prior to the first session with a secret useable by the second secure element for identifying the third shared key.

In at least one embodiment, the fourth key is a fourth shared key between the first secure element and the media relay; and re-encrypting the decrypted second payloads such that decryption of the re-encrypted second payloads requires the fourth key includes re-encrypting the decrypted second payloads with the fourth shared key. In at least one embodiment, the first secure element was preconfigured prior to the first session with the fourth shared key. In at least one embodiment, the second secure element was preconfigured prior to the first session with a secret useable by the second secure element for identifying the fourth shared key.

In at least one embodiment, the method also includes the media relay transmitting copies of the first and second payloads to an additional endpoint. In at least one embodiment, the additional endpoint includes a legal-intercept endpoint. In at least one embodiment, the method also includes the media relay re-encrypting the first and second payloads prior to transmitting copies of the first and second payloads to the additional endpoint. In at least one embodiment, the encrypted first payloads were also encrypted such that decryption of the encrypted first payloads requires a third key; the second secure element has the third key; the additional endpoint has the third key; and the media relay does not have the third key. In at least one embodiment, the encrypted second payloads were also encrypted such that decryption of the encrypted second payloads requires the third key; and the first secure element has the third key. In at least one embodiment, the encrypted second payloads were also encrypted such that decryption of the encrypted second payloads requires a fourth key; the first element has the fourth key; the additional endpoint has the fourth key; and the media relay does not have the fourth key.

In at least one embodiment, the encrypted first payloads were also encrypted such that decryption of the encrypted first payloads requires a third key; the encrypted second payloads were also encrypted such that decryption of the encrypted second payloads requires a fourth key; the media relay does not have the third key; and the media relay does not have the fourth key.

In at least one embodiment, the third key and the fourth key are the same shared end-to-end key. In at least one embodiment, the encrypted first payloads having been encrypted such that decryption of the encrypted first payloads requires the third key includes the encrypted first payloads having been encrypted with the shared end-to-end key; and the encrypted second payloads having been encrypted such that decryption of the encrypted second payloads requires the fourth key includes the encrypted second payloads having been encrypted with the shared end-to-end key. In at least one embodiment, the shared end-to-end key is shared between the first secure element and the second secure element. In at least one embodiment, one or both of the first secure element and the second secure element includes at least one tamper-resistant safeguard with respect to at least the shared end-to-end key. In at least one embodiment, the first and second secure elements were preconfigured prior to the first session with respective secrets useable for identifying the shared end-to-end key.

In at least one embodiment, the first secure element is associated with a first client device via which the first secure element communicates with the media relay; and the second secure element is associated with a second client device via which the second secure element communicates with the media relay. In at least one embodiment, the shared end-to-end key is shared between the first client device and the second client device. In at least one embodiment, the first client device is also associated with a third secure element; and the encrypted first payloads having been encrypted with the shared end-to-end key comprises the encrypted first payloads having been encrypted in the third secure element with the shared end-to-end key. In at least one embodiment, the second client device is also associated with a fourth secure element; and the encrypted second payloads having been encrypted with the shared end-to-end key includes the encrypted second payloads having been encrypted in the fourth secure element with the shared end-to-end key.

In at least one embodiment, the third key and the fourth key are different keys. In at least one embodiment, the third key is a second-secure-element private key for which there is a corresponding second-secure-element public key; the fourth key is a first-secure-element private key for which there is a corresponding first-secure-element public key; the encrypted first payloads having been encrypted such that decryption of the encrypted first payloads requires the third key includes the encrypted first payloads having been encrypted with the corresponding second-secure-element public key; and the encrypted second payloads having been encrypted such that decryption of the encrypted second payloads requires the fourth key includes the encrypted second payloads having been encrypted with the corresponding first-secure-element public key.

In at least one embodiment, the encrypted first payloads having been encrypted such that decryption of the encrypted first payloads requires the third key includes the encrypted first payloads having been encrypted in the first secure element such that decryption of the encrypted first payloads requires the third key.

In at least one embodiment, the encrypted second payloads having been encrypted such that decryption of the encrypted second payloads requires the fourth key includes the encrypted second payloads having been encrypted in the second secure element such that decryption of the encrypted second payloads requires the fourth key.

In at least one embodiment, the encrypted first payloads having been encrypted such that decryption of the encrypted first payloads requires the third key includes the encrypted first payloads having been encrypted external to the first secure element such that decryption of the encrypted first payloads requires the third key.

In at least one embodiment, the encrypted second payloads having been encrypted such that decryption of the encrypted second payloads requires the fourth key includes the encrypted second payloads having been encrypted external to the second secure element such that decryption of the encrypted second payloads requires the fourth key.

b. Second Set of Further Example Embodiments

An embodiment takes the form of a media relay that includes a media-relay communication interface; a media-relay processor; and media-relay data storage containing program instructions executable by the media-relay processor for causing the media relay to carry out a set of media-relay functions, which includes (i) receiving encrypted first payloads from a first secure element in connection with a first session, the encrypted first payloads having been encrypted in the first secure element such that decryption of the encrypted first payloads requires a first key, the media relay having been preconfigured prior to the first session with a first-key secret useable by the media relay for identifying the first key; (ii) receiving encrypted second payloads from a second secure element in connection with the first session, the encrypted second payloads having been encrypted in the second secure element such that decryption of the encrypted second payloads requires a second key, the media relay having been preconfigured prior to the first session with a second-key secret useable by the media relay for identifying the second key; (iii) generating decrypted first payloads at least in part by using the first key to decrypt the encrypted first payloads; (iv) generating decrypted second payloads at least in part by using the second key to decrypt the encrypted second payloads; and (v) transmitting the first payloads to the second secure element and the second payloads to the first secure element in connection with the first session.

c. Third Set of Further Example Embodiments

An embodiment takes the form of a method that includes (i) a media relay obtaining a first symmetric key for a first session based on a first shared secret between the media relay and a first secure element; (ii) the media relay obtaining a second symmetric key for the first session based on a second shared secret between the media relay and a second secure element; (iii) the media relay (a) receiving encrypted first payloads from the first secure element in connection with the first session, (b) generating decrypted first payloads at least in part by decrypting the encrypted first payloads with the first symmetric key, (c) generating re-encrypted first payloads at least in part by re-encrypting the decrypted first payloads with the second symmetric key, and (d) transmitting the re-encrypted first payloads to the second secure element in connection with the first session; and (iv) the media relay (a) receiving encrypted second payloads from the second secure element in connection with the first session, (b) generating decrypted second payloads at least in part by decrypting the encrypted second payloads with the second symmetric key, (c) generating re-encrypted second payloads at least in part by re-encrypting the decrypted second payloads with the first symmetric key, and (d) transmitting the re-encrypted second payloads to the first secure element in connection with the first session.

In at least one embodiment, the first payloads include first VoIP payloads; the second payloads include second VoIP payloads; and the first session includes a VoIP session.

In at least one embodiment, the first payloads include first video-chat payloads; the second payloads include second video-chat payloads; and the first session includes a video-chat session.

In at least one embodiment, the method also includes the media relay transmitting copies of the decrypted first payloads and the decrypted second payloads to an additional endpoint. In at least one such embodiment, the additional endpoint includes a legal-intercept endpoint.

In at least one embodiment, the method also includes (i) the media relay authenticating itself to the first secure element prior to receiving the encrypted first payloads; and (ii) the media relay authenticating itself to the second secure element prior to receiving the encrypted second payloads.

In at least one embodiment, the first secure element is associated with a first client device; receiving the encrypted first payloads from the first secure element includes receiving the encrypted first payloads from the first secure element via the first client device; the first client device does not have the first symmetric key; the second secure element is associated with a second client device; receiving the encrypted second payloads from the second secure element includes receiving the encrypted second payloads from the second secure element via the second client device; and the second client device does not have the second symmetric key.

d. Fourth Set of Further Example Embodiments

An embodiment takes the form of a method that includes (i) a secure element receiving first payloads in connection with a first session; (ii) the secure element generating encrypted first payloads at least in part by encrypting the first payloads such that decryption of the encrypted first payloads requires a first key; (iii) the secure element transmitting the encrypted first payloads to a media relay, the media relay having been preconfigured prior to the first session with a first-key secret useable by the media relay for identifying the first key; (iv) the secure element receiving encrypted second payloads from the media relay in connection with the first session, the encrypted second payloads having been encrypted by the media relay such that decryption of the encrypted second payloads requires a second key, the secure element having been preconfigured prior to the first session with a second-key secret useable by the secure element for identifying the second key; (v) the secure element generating second payloads at least in part by decrypting the encrypted second payloads using the second key; and (vi) the secure element outputting the second payloads.

In at least one embodiment, the first payloads include first VoIP payloads; the second payloads comprise second VoIP payloads; and the first session comprises a VoIP session.

In at least one embodiment, the first payloads comprise first video-chat payloads; the second payloads comprise second video-chat payloads; and the first session comprises a video-chat session.

In at least one embodiment: the first secure element is associated with a first client device; transmitting the encrypted first payloads to the media relay includes transmitting the encrypted first payloads to the media relay via the first client device; and receiving encrypted second payloads from the media relay includes receiving encrypted second payloads from the media relay via the first client device. In at least one such embodiment, the first client device does not have the first key and also does not have the second key.

In at least one embodiment, the first and second keys are the same key.

In at least one embodiment, the first and second keys are different keys.

In at least one embodiment, the encrypted first payloads are also encrypted such that decryption of the encrypted first payloads requires a third key, and the media relay does not have the third key. In at least one such embodiment, the encrypted second payloads were also encrypted such that decryption of the encrypted second payloads requires a fourth key, and the media relay does not have the fourth key. In at least one such embodiment, the third and fourth keys are the same end-to-end shared key; in at least one such embodiment, the end-to-end shared key is shared between the secure element and a second secure element. In at least one embodiment, the third and fourth keys are two different keys.

In at least one embodiment, generating the encrypted first payloads further includes the secure element encrypting the first payloads such that decryption of the encrypted first payloads requires the third key, and generating the second payloads further includes the secure element decrypting the encrypted second payloads using the fourth key.

In at least one embodiment, the secure element authenticates the media relay prior to transmitting the encrypted first payloads to the media relay.

e. Fifth Set of Further Example Embodiments

An embodiment takes the form of a secure element that includes a secure-element communication interface; a secure-element processor; and secure-element data storage containing program instructions executable by the secure-element processor for causing the secure element to carry out a set of secure-element functions, which includes The set of secure-element functions includes (i) receiving first payloads in connection with a first session; (ii) generating encrypted first payloads at least in part by encrypting the first payloads such that decryption of the encrypted first payloads requires a first key; (iii) transmitting the encrypted first payloads to a media relay, the media relay having been preconfigured prior to the first session with a first-key secret useable by the media relay for identifying the first key; (iv) receiving encrypted second payloads from the media relay in connection with the first session, the encrypted second payloads having been encrypted by the media relay such that decryption of the encrypted second payloads requires a second key, the secure element having been preconfigured prior to the first session with a second-key secret useable by the secure element for identifying the second key; (v) generating second payloads at least in part by decrypting the encrypted second payloads using the second key; and (vi) outputting the second payloads.

VI. Conclusion

Although features and elements are described above in particular combinations, those having ordinary skill in the art will appreciate that each feature or element can be used alone or in any combination with the other features and elements without departing from the scope and spirit of the present disclosure. Embodiments described in the form of a method may have analogous system embodiments, and vice versa.

What is claimed is:

1. A method comprising:
receiving, by a media relays, encrypted first payloads from a first endpoint in connection with a first session, the encrypted first payloads having been encrypted in the first endpoint such that decryption of the encrypted first payloads requires a first key, the media relay having been preconfigured prior to the first session with a first-key secret used by the media relay for identifying the first key;
receiving, by the media relay, encrypted second payloads from a second endpoint in connection with the first session, the encrypted second payloads having been encrypted in the second endpoint such that decryption of the encrypted second payloads requires a second key, the media relay having been preconfigured prior to the first session with a second-key secret used by the media relay for identifying the second key, the media relay generating decrypted first payloads at least in part by using the first key to decrypt the encrypted first payloads;
generating, by the media relays decrypted second payloads at least in part by using the second key to decrypt the encrypted second payloads; and
transmitting, by the media relays, the first payloads to the second endpoint and the second payloads to the first endpoint in connection with the first session, wherein the first key is a first media-relay private key for which there is a corresponding first media-relay public key, and
the second key is a second media-relay private key for which there is a corresponding second media-relay public key,
the encrypted first payloads having been encrypted in the first endpoint with the first media-relay public key, and the encrypted second payloads having been encrypted in the second endpoint with the second media-relay public key.

2. The method of claim 1, further comprising: generating, by the media relays re-encrypted first payloads at least in part by re-encrypting the decrypted first payloads such that decryption of the re-encrypted first payloads requires a third key, wherein the second endpoint is preconfigured with a third-key secret used by the second endpoint for identifying the third key; and
generating, by the media relay, re-encrypted second payloads at least in part by re-encrypting the decrypted second payloads such that decryption of the re-encrypted second payloads requires a fourth key, wherein the first endpoint is preconfigured with a fourth-key secret used by the first endpoint for identifying the fourth key,
wherein transmitting the first payloads to the second endpoint comprises transmitting the re-encrypted first payloads to the second endpoint; and
wherein transmitting the second payloads to the first endpoint comprises transmitting the re-encrypted second payloads to the first endpoint.

3. The method of claim 1, further comprising transmitting, by the media relay, copies of the first and second payloads to an additional endpoint.

4. The method of claim 3, wherein the additional endpoint comprises a legal-intercept endpoint.

5. The method of claim 3, further comprising re-encrypting, by the media relay, re-encrypting the first and second payloads prior to transmitting copies of the first and second payloads to the additional endpoint.

6. The method of claim 3, wherein the encrypted first payloads were also encrypted such that decryption of the encrypted first payloads requires a third key.

7. The method of claim 6, wherein the encrypted second payloads were also encrypted such that decryption of the encrypted second payloads requires the third key.

8. The method of claim 6, wherein the encrypted second payloads were also encrypted such that decryption of the encrypted second payloads requires a fourth key.

9. The method of claim 1, wherein:
the encrypted first payloads were also encrypted such that decryption of the encrypted first payloads requires a third key; and
the encrypted second payloads were also encrypted such that decryption of the encrypted second payloads requires a fourth key.

10. The method of claim 9, wherein the third key and the fourth key are the same shared end-to-end key.

11. The method of claim 9, wherein the third key and the fourth key are different keys.

12. The method of claim 1, wherein one or both of the first and second endpoints is a communication device.

13. The method of claim 1, wherein one or both of the first and second endpoints is an application executing on a communication device.

14. The method of claim 1, wherein one or both of the first and second endpoints is a secure element.

15. A media relay comprising: a cryptography module preconfigured with a first-key secret useable by the media relay for identifying a first key and a second-key secret useable by the media relay for identifying a second key; and
a communication module configured to:
receive encrypted first payloads from a first endpoint in connection with a first session, the encrypted first payloads having been encrypted in the first endpoint such that decryption of the encrypted first payloads requires the first key;

receive encrypted second payloads from a second endpoint in connection with the first session, the encrypted second payloads having been encrypted in the second endpoint such that decryption of the encrypted second payloads requires the second key; and pass the received encrypted first payloads and the received encrypted second payloads to the cryptography module, wherein the cryptography module is configured to:

generate decrypted first payloads at least in part by using the first key to decrypt the encrypted first payloads;

generate decrypted second payloads at least in part by using the second key to decrypt the encrypted second payloads; and pass the decrypted first payloads and the decrypted second payloads to the communication module, wherein the communication module is further configured to transmit the first payloads to the second endpoint and the second payloads to the first endpoint, the first key is a first media-relay private key for which there is a corresponding first media-relay public key, and the second key is a second media-relay private key for which there is a corresponding second media-relay public key, the encrypted first payloads having been encrypted in the first endpoint with the first media-relay public key, and the encrypted second payloads having been encrypted in the second endpoint with the second media-relay public key.

16. The media relay of claim 15, wherein one or both of the first and second endpoints is selected from the group consisting of a communication device and an application executing on a communication device.

17. The media relay of claim 15, wherein one or both of the first and second endpoints is a secure element.

* * * * *